(12) United States Patent
Perlstein

(10) Patent No.: US 11,008,201 B2
(45) Date of Patent: May 18, 2021

(54) AUTOMATED ROLLING-JACK FOR DRIVE-ON LIFTS

(71) Applicant: BALDOMAR SYSTEMS LLC, Berkeley, CA (US)

(72) Inventor: Zachary Perlstein, Troy, NY (US)

(73) Assignee: Mohawk Lifts, LLC, Amsterdam, NY (US)

( * ) Notice: Subject to any disclaimer, the term of this patent is extended or adjusted under 35 U.S.C. 154(b) by 332 days.

(21) Appl. No.: 15/720,014

(22) Filed: Sep. 29, 2017

(65) Prior Publication Data

US 2019/0100420 A1    Apr. 4, 2019

(51) Int. Cl.
| | |
|---|---|
| *B66F 7/26* | (2006.01) |
| *B66F 7/00* | (2006.01) |
| *B66F 5/00* | (2006.01) |
| *G05G 15/04* | (2006.01) |
| *G05G 23/00* | (2006.01) |
| *G05D 3/00* | (2006.01) |

(52) U.S. Cl.
CPC .................. *B66F 7/26* (2013.01); *B66F 5/00* (2013.01); *B66F 7/00* (2013.01); *G05G 15/04* (2013.01); *G05G 23/00* (2013.01); *G05D 3/00* (2013.01)

(58) Field of Classification Search
None
See application file for complete search history.

(56) References Cited

U.S. PATENT DOCUMENTS

| | | | |
|---|---|---|---|
| 4,050,545 A | 9/1977 | Hunter | |
| 4,319,666 A | 3/1982 | Hunter | |
| 5,887,854 A * | 3/1999 | Musson | B66F 7/00 254/89 H |
| 9,376,296 B2 | 6/2016 | Nussbaum | |
| 2014/0076665 A1* | 3/2014 | Nussbaum | B66F 7/20 187/203 |
| 2014/0161583 A1* | 6/2014 | Luinge | B66F 7/28 414/800 |

(Continued)

OTHER PUBLICATIONS

Hunter Engineering Company, "Lift Rack Accessories For Hunter wheel alignment lift racks", Form 5262-T, Apr. 2017, https://www.hunter.com/Portals/0/Media/5262-T.pdf (Year: 2017).*

(Continued)

*Primary Examiner* — Christian Chace
*Assistant Examiner* — Katherine Marie Fitzharris
(74) *Attorney, Agent, or Firm* — Heslin Rothenberg Farley & Mesiti P.C.

(57) ABSTRACT

Techniques are disclosed for methods and systems for automating the operation of a rolling-jack system for the servicing of automotive vehicles. The rolling-jack(s) travel/transport between the runways of a drive-on lift. They have automated/motorized transportation, engagement and jacking power mechanisms. These mechanisms are controlled by a guidance system which guides/controls them for a fully automated operation. A number of technologies may be used for this purpose, including sensors onboard the vehicles and/or the drive-on lifts and/or the rolling-jacks and/or the service center. A computer vision pipeline may also be utilized to assist in the process. Machine learning may also be employed. Techniques are also extended to autonomous vehicles as well as interfacing with fleet management software.

20 Claims, 9 Drawing Sheets

(56) References Cited

U.S. PATENT DOCUMENTS

2016/0025821 A1* 1/2016 Widmer ............. G01R 33/0047
                                                324/258
2016/0052415 A1* 2/2016 Bell .................... B60L 53/39
                                                320/108
2016/0053415 A1* 2/2016 Ikenaka ................ D04B 1/123
                                                66/194

OTHER PUBLICATIONS

Hunter Engineering Company, "Lift Rack Accessories For Hunter wheel alignment lift racks", Form 5262-T, Apr. 2017, https://www.hunter.com/Portals/0/Media/5262-T.pdf (Year: 2017).*
Atlas Auto Equipment, "Rolling Jacks", www.atlasautoequipment.com, Aug. 9, 2017, USA.
Bend Pak, "Rolling Jack", www.bendpak.com/car-lifts, Aug. 9, 2017, USA.
Hunter, "Lift Rack Accessories", www.hunter.com/portals, Aug. 9, 2017, USA.
JMC Equipment, "Rolling Jacks", www.jmcautomotiveequipment.com, Aug. 9, 2017, USA.
Mohawk Lifts, "Rolling Jack 2", www.mohawklifts.com/wp, Aug. 17, 2017, USA.
Mohawk Lifts, "Mohawk Model RJ-20", Specs, www.mohawklifts.com/library, Aug. 17, 2017, USA.
Mohawk Lifts, "Rolling Jack", www.mohawklifts.com/wp, Aug. 17, 2017, USA.
Redline, "Rolling And Sliding Jacks", www.redlinestands.com/catalog, Aug. 9, 2017, USA.

* cited by examiner

AUTOMATED ROLLING-JACK FOR DRIVE-ON LIFTS

RELATED APPLICATIONS

This application is related to U.S. patent application Ser. No. 15/603,320 filed on May 23, 2017, which is incorporated herein by reference in its entirety.

FIELD OF THE INVENTION

This invention relates generally to vehicle lifts and more specifically to automating the operation of rolling-jacks for drive-on lifts.

BACKGROUND ART

In recent years, there has been significant investment in the industry in the area of automotive vehicle maintenance operations. This investment has been heavy in shop or facility or service center optimization for increasing the efficiency of the technician/worker as well as their effectiveness and safety. From shop design and scheduling systems to integration of handheld devices for personal display of vehicles diagnostics, investments in Lean Operations are paying off in terms of human capital efficiency, volume, and margin. Fleet managers frequently measure service center efficiency in terms of percentage of labor hours billed, and number of jobs completed or vehicle turnover. Service providers operate under the assumption that improving these metrics increases service center profitability.

Automotive technicians spend approximately fifteen to twenty minutes per service order, or approximately seventy-five minutes per day while servicing five vehicles, on the following routine exercises: retrieving the vehicle from the service center parking lot, driving it to the service bay equipped with a suitable vehicle lift, aligning it to the vehicle lift, manually positioning the lift to the vehicle lift points to ensure a secure and safe hoist, manually transporting a rolling-jack on a drive-on lift for engagement underneath the vehicle, disengaging the lift and/or the rolling-jack from the vehicle, and subsequently returning the vehicle to the service center parking lot once the service has been completed. This time typically depends on service center setup, vehicle type, vehicle lift type and whether or not a rolling-jack is used. A rolling-jack on a drive-on lift is used if clearance for the wheel is required to either change a tire, or for other maintenance requests.

As a general rule, it is required to raise a vehicle above ground in order to perform various services, such as inspection, repair or other maintenance on the vehicle. For this purpose, various types of lifts have been devised in the industry. The lifts of particular relevance for the present disclosure are drive-on lifts that employ rolling-jacks to provide additional clearance around the wheels for technicians. Such increased clearance may be needed for jobs that require the vehicle to be "wheels free" by having one or more wheels lifted above the runways of the lift. Such jobs include tire rotation and wheel alignment among others.

In such a setup, one or more rolling-jacks traverse, travel or move laterally between the runways of the drive-on lift. The rolling-jack(s) are either integrated with the drive-on lift at the time of manufacturing, or are added-on to the lift after manufacturing. Rolling jacks are said to engage with the vehicle when their two lift pads engage transversely or laterally with two lift points on the underside of the vehicle. The present techniques automate the operation of such lifts along with the rolling-jack(s) as will be taught in this disclosure.

There are prior art designs for manual rolling-jacks. U.S. Pat. No. 4,050,545 to Hunter discloses a design for a vehicle lifting jack assembly comprising a swing type jack mounted on a vehicle lift rack in position to swing from a folded position. This allows complete lowering of the rack to an operative vehicle lift position. Also provided is a safety means which locks the jack in the lift position to prevent folding and thus provides positive retention of the jack in any of its vehicle lift positions.

U.S. Pat. No. 4,319,666 also to Hunter discloses a service jack to be mounted on a vehicle lift rack for movement into desired places along the runways of the lift rack. The service jack includes a carriage suspended between the runways and an elongated vehicle lifting jack assembly operably supported by the carriage for vertical movement toward and away from the frame members of a vehicle supported on the runways. There is a fluid pressure lifting member between the carriage and the vehicle lifting jack assembly and releasable safety device responsive to raising of the vehicle lifting jack assembly for preventing its accidental reverse movement. Also included are devices for guiding and maintaining the vehicle lifting jack assembly in a substantially level attitude in all positions.

There are several manual rolling-jacks offered by various manufacturers, in different sizes, configurations, and lifting capacities. These include, APEX RJ7 Jack, RJ35 Sliding Jack, RJ45 Light Commercial Grade Rolling Jack, RJ16 Commercial Grade Rolling Jack, etc. from Atlas Auto Equipment. These further include 9000-lb capacity rolling bridge jacks RJ-7, RJ-9, RJ-15, RJ-18, RJ-25 by BendPak, 9000-lb capacity dual and triple composite cylinder swing air jacks 133-84-1 and 133-85-1 respectively by Hunter, 7000-lb capacity models 8710, 8720, 8730, 8740 and 9000-lb capacity models 8910, 8920, 8930, 8940 by Branick, 3500-lb SJ-35 sliding bridge jack, 6000-lb capacity RAJ-6K rolling bridge jack and 8000-lb RAJ-8K rolling bridge jack by Kernel Manufacturing, 6000-lb capacity BJ6000 rolling bridge jack for Triumph lifts as well as 7,500-18,000 lb capacity rolling bridge air jacks by Challenger. Also included in these market products are heavy-duty or high-capacity rolling-jacks such as RJ-20 electric/hydraulic rolling jack by Mohawk Lifts with capacities of 20,000-lb to 50,000-lb or even higher.

Moreover, U.S. Pat. No. 9,376,296 B2 to Nussbaum teaches techniques employing a camera for lift engagement of fixed two-post lifts. According to the patent, a fixed two-post hoist/lift with two lifting columns arranged at both sides of a vehicle is used. Each lift has two support arms that are supported in a horizontally pivotal and longitudinally adjustable fashion at the lifting column, and each having at their free end a support plate. The support plates are position-able at support positions underneath a vehicle as specified by the vehicle manufacturer by an appropriate movement of the support arm. The manufacturer support positions are saved as target positions according to corresponding vehicle model in a data memory of the hoist.

The system allows for a semi-automatic or automatic operation by employing a camera affixed in the service bay above the vehicle for optically detecting the contour of the vehicle in reference to the hoist. The coordinates of actual positions of the support plates of the hoist are determined by measurements and perhaps calculations. A computer makes a comparison between the target and actual coordinates, and enables a lifting process of the support arms only when differences between the target and the actual coordinates are within a predetermined tolerance.

All prior art rolling-jack systems require a technician for proper positioning of the jack underneath the vehicle so a safe engagement and hoisting/lifting can occur. The technician manually slides or rolls the jack, typically on rails or "lips" or railing on the inner underside of the lift runways. Once the technician has positioned the jack underneath the vehicle, he/she manually extends the lifting arm of the jack so that the two lift pads on the two ends of the arm are properly positioned directly underneath the lifting or lift points of the vehicle.

If the rolling jack is a swing type rolling jack, the technician must first swing or flip the jack to its vertical hoisting position, and then manipulate its arms so that the lift pads are directly underneath the lift points of the vehicle. In either case, the lift points that the lift pads are to engage with are located directly transversely/laterally underneath the vehicle for proper balancing of the weight of the vehicle on the jack. At this juncture, the technician activates the appropriate controls on the jack to lift the wheels of the vehicle off the runways of the lift.

Thus, a key limitation of the prior art is that it fails to disclose rolling-jacks whose operation can be fully automated. There are no teachings in the prior to automatically transport, roll or slide the jack underneath the vehicle, automatically manipulate its lift pads underneath the lift points of the vehicle, and then to automatically lift the vehicle. The prior art does not utilize sensors deployed on the rolling-jacks and/or the lifts and/or the environment for the above-mentioned automation. There are also no teachings in the traditional art that will enable an autonomous vehicle to automatically drive itself to a service bay with a suitable lift in a service center when a service of the vehicle is due. The prior art also does not teach any techniques where sensors present onboard the vehicles (autonomous or otherwise) are used to assist in the above-mentioned automation.

An advantage of such a system will be reduced technician time and labor costs. This would lead to an increased throughput and a better bottom-line for the service center. Further, according to industry leaders, ninety percent of accidents are related to human errors, and technicians face both incidental and chronic injuries due to workplace conditions. Thus, such a system would also have the advantage of increasing worker safety because the majority of vehicle lift accidents occur as a result of human error during the engagement of the rolling-jack and/or the lift with the vehicle.

The improvement in worker safety would lead to a reduction in missed work days due to an improvement in technician workplace ergonomics, as well as avoidance of missed days due to injuries. This will also lead to a reduction in insurance expenses for the service center. Additionally, such a system absent from the prior art, would also minimize potential damage to the vehicle by incorrect positioning of the rolling-jacks by human technicians.

OBJECTS OF THE INVENTION

In view of the shortcomings of the prior art, it is an object of the present invention to provide methods and apparatus/systems for automating the operation of rolling-jacks operating in conjunction with drive-on lifts.

It is also an object of the invention to provide for methods and apparatus/systems for automating the engagement process of a rolling-jack with a vehicle, as well its safe hoisting/lifting.

It is also an object of the invention to provide for above mentioned automation for both autonomous and semi/non-autonomous vehicles.

It is also an object of the invention to employ various sensors to assist in the above-mentioned automation.

It is yet another object of the invention to reduce the technician time required to operate a vehicle lift system with rolling-jacks.

It is still another object of the invention to improve worker safety and ergonomics in the service center via automation of the vehicle lifts with rolling-jacks.

Still other objects and advantages of the invention will become apparent upon reading the summary and the detailed description in conjunction with the drawing figures.

SUMMARY OF THE INVENTION

The objects and advantages of the invention are secured by methods and systems for automating the operation of rolling-jacks on drive-on automotive lifts. Such drive-on lifts include but are not limited to four-post, scissor and parallelogram lifts. A drive-on lift may have one or more rolling-jacks attached/connected to it either in an integrated/manufactured or a retrofitted manner. Each rolling-jack has a transport mechanism for moving or transporting the rolling-jack between and along the two runways of the drive-on lift.

The transportation typically employs motorized wheels on the two lateral sides of the rolling-jacks that move or "roll" over railings or "lips" or rails of the runways of the drive-on lift. Other means of implementing such a lateral movement of the rolling-jack alongside the runways of the lift are also conceivable. These include chain or belt mechanisms for moving or sliding the rolling-jacks alongside and between the runways.

According to the techniques described herein, the transport mechanism of the rolling-jack transports it between the runways of the drive-on lift and positions it at its engagement location. The engagement location of the rolling-jack is underneath the vehicle parked on the runways at a location/position where proper engagement and safe hoisting or lifting of the vehicle can occur. As will be explained, the engagement location is underneath the lift points of the vehicle that will be engaged for lifting the vehicle.

A jacking power mechanism jacks or moves the lift pads up and down with the weight of the vehicle (including any load on the vehicle) resting on them. Of course, the lift pads may be jacked without the vehicle weight as well. Once activated, the jacking power mechanism imparts appropriate jacking power to the system to raise and lower the lift pads as desired.

Above jacking power includes hydraulic, electrical, mechanical, electromechanical and/or other types of power. The jacking power mechanism may further include one or more sub-systems to evenly distributed the load in the lateral direction so that the vehicle can be safely and stably lifted. For example, a hydraulic jacking power mechanism may have more than one cylinders evenly distributed laterally across the rolling-jack.

An engagement mechanism is provided which is responsible for engaging the rolling-jack with the vehicle. For this purpose, the rolling-jack has two lift pads on its two lateral ends which make contact or engage with the vehicle at two lift points within a prescribed tolerance. Lift pads may have a soft rubber-like surface or a hard, metallic surface. In the preferred embodiment, the engagement mechanism first automatically flips or swings the rolling-jack from a stored or folded or horizontal position to a vertical or operative position before, after or during its transportation to its engagement location.

In this preferred embodiment, the engagement can only occur in the vertical or operative position of the rolling-jack. Once in its vertical position, the rolling-jack may be automatically locked in this vertical position by an appropriate electrical, mechanical or electromechanical mechanism to ensure secure lifting of the vehicle. In other variations, the rolling-jack is always in its vertical position without a swing/flip capability for horizontal storage.

In any case, for the engagement of the rolling-jack to occur, the engagement mechanism first preferably performs any necessary lateral adjustment of the reach of the lift pads. In such an embodiment, the engagement mechanism is adjustable so that the lateral reach or distance between the lift pads can be adjusted. Many ways of such an adjustable engagement mechanism can be conceived.

Techniques for such an adjustable engagement mechanism include having two laterally opposite telescopic or robotic ends, each with a single motorized drive or a single motorized drive for both ends. To adjust the reach, the drive(s) elongate or retract the telescopic/robotic ends which are connected by an arm of the rolling-jack. The lift pads are then located on each of those telescopic ends and the jacking power mechanism jacks up and down the arm along with its telescopic ends and the lift pads.

In a related embodiment, the reach of the lift pads is fixed, and the above step of reach adjustment is skipped. In such variations, the rolling-jack has lift pads that are fixed to a given location on the rolling-jack. In an exemplary embodiment, such a location may be directly above a sub-system of a hydraulic jacking power mechanism.

There is also a guidance system which guides or controls the transportation mechanism, the engagement mechanism and the jacking power mechanism for automating the above-described operation. Specifically, the guidance system is responsible for activating the transportation mechanism to automatically move/transport the rolling-jack between and alongside the runways to bring it to its engagement location underneath the lift points of the vehicle.

The guidance system is also responsible for guiding the engagement mechanism so that the rolling-jack can be flipped if needed as per above explanation. It is also responsible for guiding an adjustable engagement mechanism if present, to adjust the reach of its lift pads.

The guidance system is further responsible for performing any needed fine-tune adjustments of the positioning of the rolling-jack as well its lift-pads just prior to engagement to ensure a safe and secure lift. It performs this fine-tuning by appropriate activation of the transport mechanism and/or the drive(s) of its adjustable engagement mechanism if present. Each of transportation, engagement and jacking power mechanisms allow for respective manual override modes, in which they can be operated completely manually by over-riding the guidance system.

The lift points of the vehicle are preferably the prescribed lift or hoist points provided by an appropriate entity related to the vehicle, such as its manufacturer, dealer, service provider, etc. Several such lift points, usually in laterally facing pairs, along the underside of the vehicle may be provided. Alternatively, the lift points may be computed/calculated by the guidance system for a given vehicle. This computation is preferably based on vehicle parameters such as vehicle make, model, length, width, diameter of the tires/wheels, locations and sizes of the axles, etc. The computation may further depend on the weight of the vehicle, whether it is loaded or not, and other load related and stability factors/parameters. Additionally, the acceptable tolerance for engagement is also either prescribed or calculated per above.

Before engagement commences, the guidance system first activates the transport mechanism of the rolling-jack to transport it to its engagement location. Before, during or after this transportation, the guidance system also commands the engagement mechanism to swing the rolling-jack to its vertical and locked position if necessary. As noted earlier, some rolling-jacks may not have a swing capability, so this step may not be necessary. At this juncture, if there is an adjustable engagement mechanism present, the guidance system further commands its drive(s) to adjust its reach so that the lift pads are directly underneath their corresponding lift points.

In one embodiment, the guidance system then also performs any needed fine-tuning of the position of the rolling-jack as well as the lift pads if an adjustable engagement mechanism is present. It does this fine-tuning by further activating/deactivating the transport mechanism and/or motorized drive(s) of the adjustable engagement mechanism. In any case, just before activating the jacking power mechanism, brakes are preferably applied to the transport mechanism to prevent accidental movement of the rolling-jack during lifting.

Now the guidance system activates the jacking power mechanism to lift or raise its two lift pads to just make contact or engage with the lift points within the prescribed tolerance. At this juncture, in one embodiment, any further operation is paused by the guidance system. The reason is that now a technician can arrive to visually inspect the just engaged rolling-jack and determine if any manual fine-tune adjustments need to be further made. This is the semi-automatic mode of operation of the system.

After human inspection and any manually over-ridden adjustments, the guidance system resumes the activation of the jacking power mechanism and continues lifting the vehicle to the desired height required to perform the needed service. In a highly useful alternate embodiment, the operation of the system is fully automatic and is not paused for a human inspection before engagement. In this case, the guidance system continues activation of the jacking power mechanism to lift the vehicle to the desired height required to perform the service.

The above-described automation of the transport mechanism, the engagement mechanism and the jacking power mechanisms under the control/guidance of the guidance system are some of the key distinguishing aspects of the invention. The types of services performed on the vehicle once the vehicle is raised include inspection, maintenance, repair/replacement, tire rotation, wheel alignment or any other services.

In the preferred embodiment, the rolling-jack and/or the drive-on lift can communicate with each other as well as any backend system and/or an onboard diagnostics system of the vehicle via a wired or a wireless mode of communication. The backend system may be the backend/server component of the guidance system, a service order (SO) management system, a fleet management system or some other backend Information Technology (IT) system.

The advantage of integrating with a fleet management system is that the guidance system knows in advance when a vehicle is or can be scheduled for its routine maintenance or for some other service. This further automates the vehicle fleet maintenance process and reduces vehicle downtime. The backend system may be hosted in the cloud. The communication is enabled by implementing an application programming interface (API). Preferably, it is the guidance system which integrates with the backend via the above API.

In some implementations, more than one rolling-jack may be employed with a single drive-on lift. In such a setup, one rolling-jack may have its engagement location at the front of the vehicle, another at the back, and yet another (or more if needed) somewhere in the middle. This way, the entirety of the vehicle can be raised by the rolling-jacks. The same principles described earlier apply to the automation of such a multi-jack system. However, in such an embodiment, the rolling-jacks are first preferably locked/synchronized by the guidance system before raising and lowering of the vehicle in a safe and stable manner.

The guidance system utilizes any combination of sensors, computer vision and machine learning in its guiding/controlling of the transport mechanism, engagement mechanism and/or jacking power mechanism of the system. The sensors may be installed in the service bays, the overall service center, the rolling-jacks as well as the drive-on lifts. The sensors are preferably only installed on the rolling-jacks and/or the drive-on lift, so that no retrofitting of the service center is required.

Sensors may also be present onboard the vehicles themselves for assisting in the automation. The sensors may be integrated into the rolling-jacks, drive-on lifts and the vehicles during their manufacturing process, or they may be installed on the vehicles afterwards on a retrofit basis.

Sensors on the vehicles are preferably used to communicate the coordinates of the lift points to the guidance system. The guidance system uses this information to guide the transport mechanism of rolling-jacks to transport them to their corresponding engagement locations. It may also use this information to adjust the reach of the lift pads if possible, to ensure secure engagement.

Sensors used by the system include but are not limited to cellular transceivers, Global Positioning System (GPS) sensors, Wi-Fi transceivers, WiMax transceivers, Ultra-wideband (UWB) sensors, Lidars, radars, sonars, Bluetooth transceivers, beacons, ZigBee sensors, IPv6 over Low power Wireless Personal Area Networks (6LoWPAN) sensors, accelerometers, gyroscopes, vibration sensors, optical flow sensors, compasses, magnetometers, Hall effect sensors, acoustic sensors, microwave sensors, ultrasonic sensors, infrared sensors, radio frequency identification (RFID) sensors, angle sensors, laser based obstruction sensors, image sensors, cameras, and compression sensors, among others.

Guidance system may also use an indoor positioning system (IPS) or an IPS-like solution to achieve its objectives. Moreover, camera(s) on the vehicles, and/or the service bay and/or the rolling-jacks and/or the drive-on lifts and an associated computer vision pipeline may also be deployed for this automation. Supervised and/or unsupervised machine learning may also be used in conjunction with computer vision.

In another very useful set of embodiments, the present techniques are extended to autonomous vehicles with onboard sensors. The autonomous vehicles drive automatically to an appropriate empty service bay of the service center by virtue of their own self-navigation. Instead or in addition, they are automatically directed by the guidance system to the service bay where they are to be serviced. Guidance system may use the make/model, dimensions and weight of the vehicle and service details/requirements, to determine an appropriate service bay with an appropriate lift for the service of the vehicle. In a similar fashion, by providing appropriate driving directions to a human driver, the above techniques are also extended to semi-autonomous as well as non-autonomous vehicles.

Clearly, the systems and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
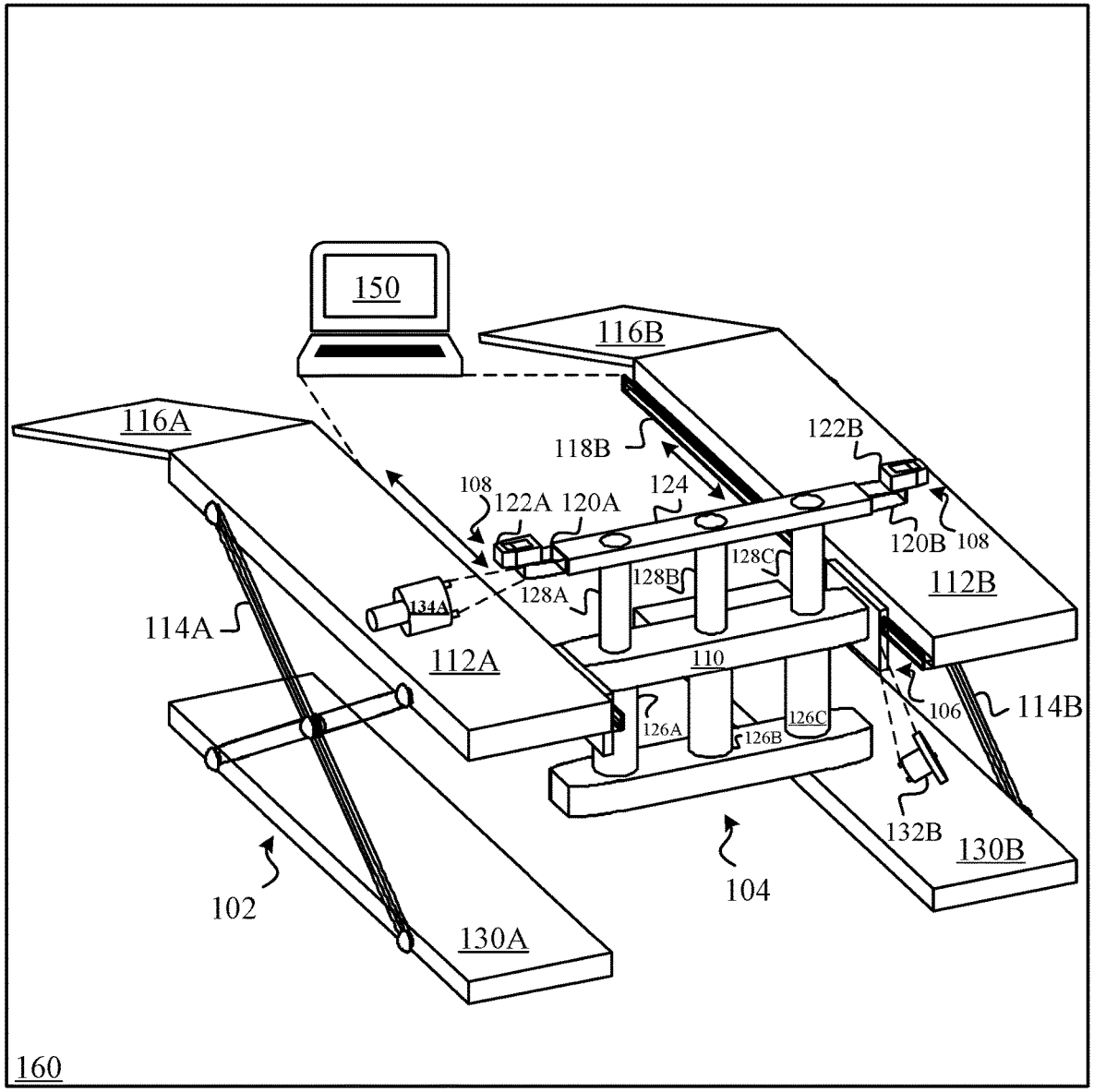
FIG. 1 illustrates in a left isometric view an automated rolling-jack system of the instant invention employing a drive-on lift and one rolling-jack.

The present invention will be best understood by first reviewing an automated rolling-jack system 100 as illustrated in FIG. 1. FIG. 1 shows in a left isometric view automated/automatic rolling-jack system 100 comprising an automotive drive-on scissor lift 102 with runways 112A and 112B, ramps 116A and 116B, and a base comprising members 130A and 130B and scissors 114A and 114B. Drive-on lift 102 is located in bay 160 of a service center.

There are also other types of lifts supported by the instant principles besides the scissor lift shown in the exemplary embodiment of FIG. 1. These include four-post lifts comprising four vertical lifting columns supporting the runways. Other lift types also supported include parallelogram lifts in which runways are lifted by supporting members in a geometric configuration of a parallelogram. Further, drive-on runways may also be deployed around a maintenance "pit". Moreover, there are also heavy-duty or high-capacity lifts supported by the present design as will be discussed in detail in reference to FIG. 9 further below in this disclosure.

System 100 of FIG. 1 further includes an automatic rolling-jack 104 of the present design. Specifically, rolling or sliding jack 104 comprises a transportation/transport mechanism 106 that is responsible for moving or transporting rolling-jack 104 between and along runways 112A-B of drive-on lift 102. Mechanism 106 typically houses powered wheels or rollers (not shown in FIG. 1) that move inside and along lips/rails 118A and 118B of runways 112A and 112B respectively. Note that in the left isometric view shown in FIG. 1, lip 118A of runway 112A is not visible. Thus, wheels housed in transportation mechanism 106 on the both lateral sides of jack 104 can securely move along lips/rails 118A-B of runways 112A-B respectively.

Mechanism 106 can also employ a number of other techniques available to skilled artisans. These include having a sprocket-wheel mechanism where the teeth of a sprocket-wheel inside mechanism 106 roll over a chain or track inside lips/rails 118A-B, a pully mechanism where jack 104 is pulled between runways 112A-B by a belt or a chain, as well as other drive/propulsion mechanisms.

In any case, mechanism 106 is motorized/powered rather than manual according to the present teachings. In one embodiment, such motorization involves having an electrical drive/motor that rolls or drives the wheels, or rollers, or sprocket-wheels of mechanism 106 to move rolling-jack 104 along lips/rails 118A, 118B of runways 112A, 112B respectively. Such an implementation is illustrated in FIG. 1 where electric motor 132B shown in an exploded view drives wheels/rollers of transport mechanism 106. A corresponding motor 132A to propel/drive the left side of rolling-jack 104 is presumed to exist but not visible in the view of FIG. 1.

According to the techniques described herein, transportation mechanism 106 of rolling-jack 104 transports it between runways 112A-B of drive-on lift 102 and positions it at its engagement location. This transverse or lateral movement of rolling-jack 104 between and across runways 112A-B is indicated by the double-ended arrows shown along the inside of runways 112A-B in FIG. 1. The engagement location of rolling-jack 104 is underneath a vehicle (not shown in FIG. 1) parked on runways 112A-B at a location/position where proper engagement and safe hoisting or lifting of the vehicle can occur. As will be explained, the engagement location is along the runways and underneath the lift points of the vehicle that will be engaged for lifting the vehicle.

FIG. 1 further shows a jacking power mechanism 110 of rolling-jack 104 which jacks or moves its engagement mechanism 108 with lift pads 122A and 122B and arm 124, up and down along with the weight of the vehicle resting on them (including any load on the vehicle itself). Of course, engagement mechanism 108 may be jacked up/down without the vehicle as well. Once activated, jacking power mechanism 110 imparts appropriate jacking power to raise and lower the lift pads as desired.

Above jacking power includes hydraulic, electrical, mechanical, electromechanical and/or other types of power. The embodiment shown in FIG. 1 uses hydraulic power. Jacking power mechanism 110 may further include one or more sub-systems to evenly distributed the load in the lateral direction so that the vehicle can be safely and stably lifted. For example, a hydraulic jacking power mechanism may have more than one hydraulic cylinders evenly distributed laterally across the rolling-jack. In the embodiment shown in FIG. 1, members or jacking rods 128A, 128B and 128C hydraulically move in and out of larger cylinders 126A, 126B and 126C respectively. Other related electromechanical componentry for such a hydraulic system is known in the art and is not delved into detail in this specification.

Figure 2:
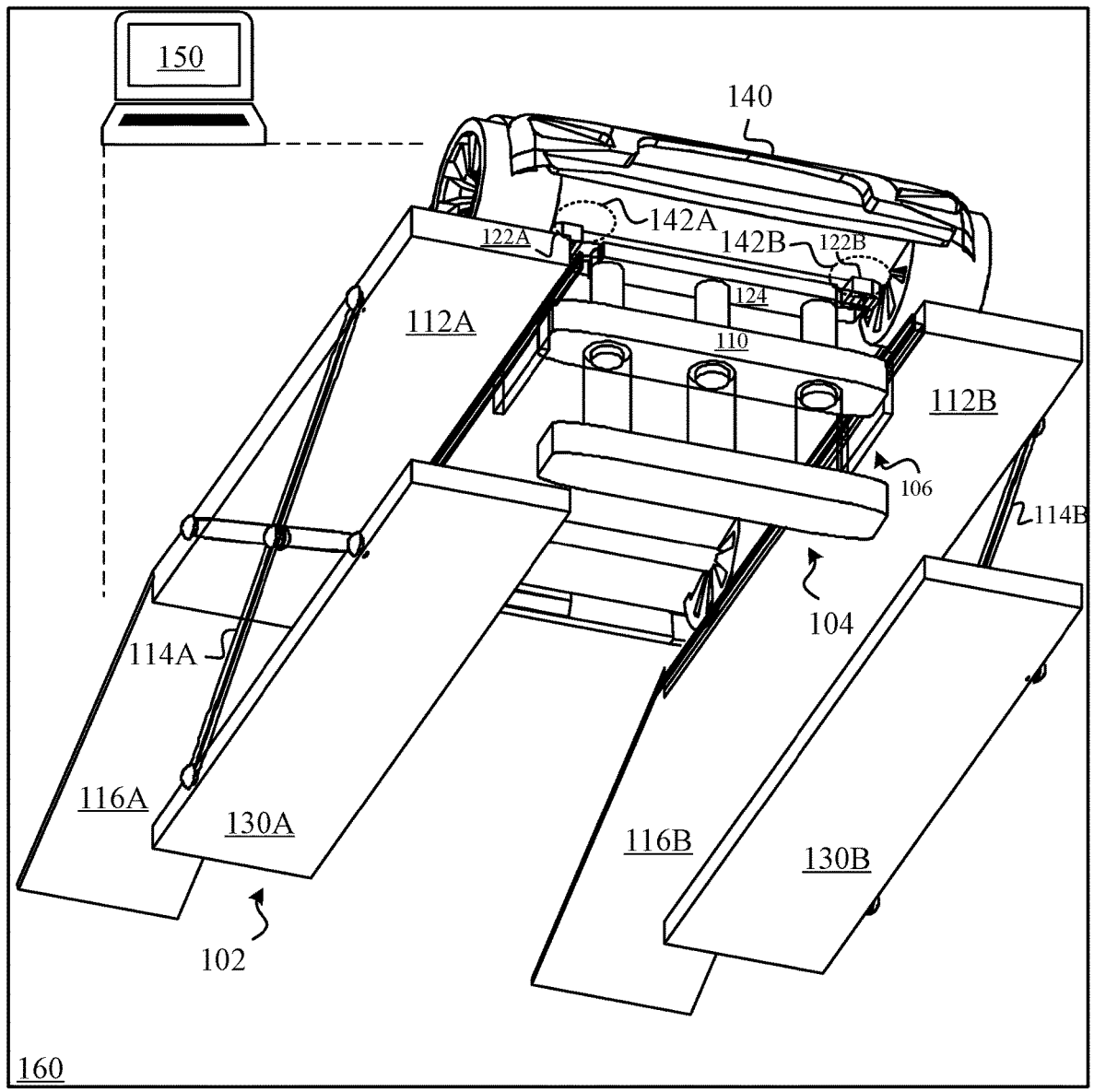
FIG. 2 shows a custom view of the instant automated rolling-jack system of FIG. 1 from the underside, showing a vehicle/car being parked on the drive-on lift and being lifted by the rolling-jack.

Engagement mechanism 108 is responsible for engaging rolling-jack 104 with a vehicle. To understand this better, let us turn our attention to FIG. 2 showing a custom view of lift 102 with jack 104 of the present teachings. Several reference numerals from FIG. 1 have been omitted in FIG. 2 to avoid clutter. The view from the underside of lift 102 also shows a vehicle 140 parked on runways 112A-B.

FIG. 2 also shows lift pads 122A and 122B of rolling-jack 104 at its two lateral ends. Lift pads 122A and 122B make contact or engage with vehicle 140 at two lift points 142A and 142B respectively within a prescribed tolerance. Lift points 142A-B may in fact be lift regions where lift pads 122A-B can safely engage. Differently stated, there is an acceptable "tolerance" of lift points 142A-B. Such a lift region or acceptable tolerance is indicated by oval shapes with dotted lines in FIG. 2. Note that in some situations, such an acceptable tolerance is zero or close to zero, meaning that lift-pads 122A-B need to engaged with lift points 142A-B at a precise point. In such a situation, there will be no oval shapes with the dotted lines shown in FIG. 2 and lift points 142A-B will be two precise points. Furthermore, many such lift points/regions may be available, in laterally facing pairs, along the underside of the vehicle. Their number could be 4, 6, 8 or more.

Lift pads 122A-B of FIG. 1-2, may have a soft rubber-like surface or a hard, metallic surface. In the preferred embodiment, engagement mechanism 108 first flips or swings the rolling-jack from a stored or horizontal position to a vertical position before, after or during its transportation to its engagement location.

Figure 3:
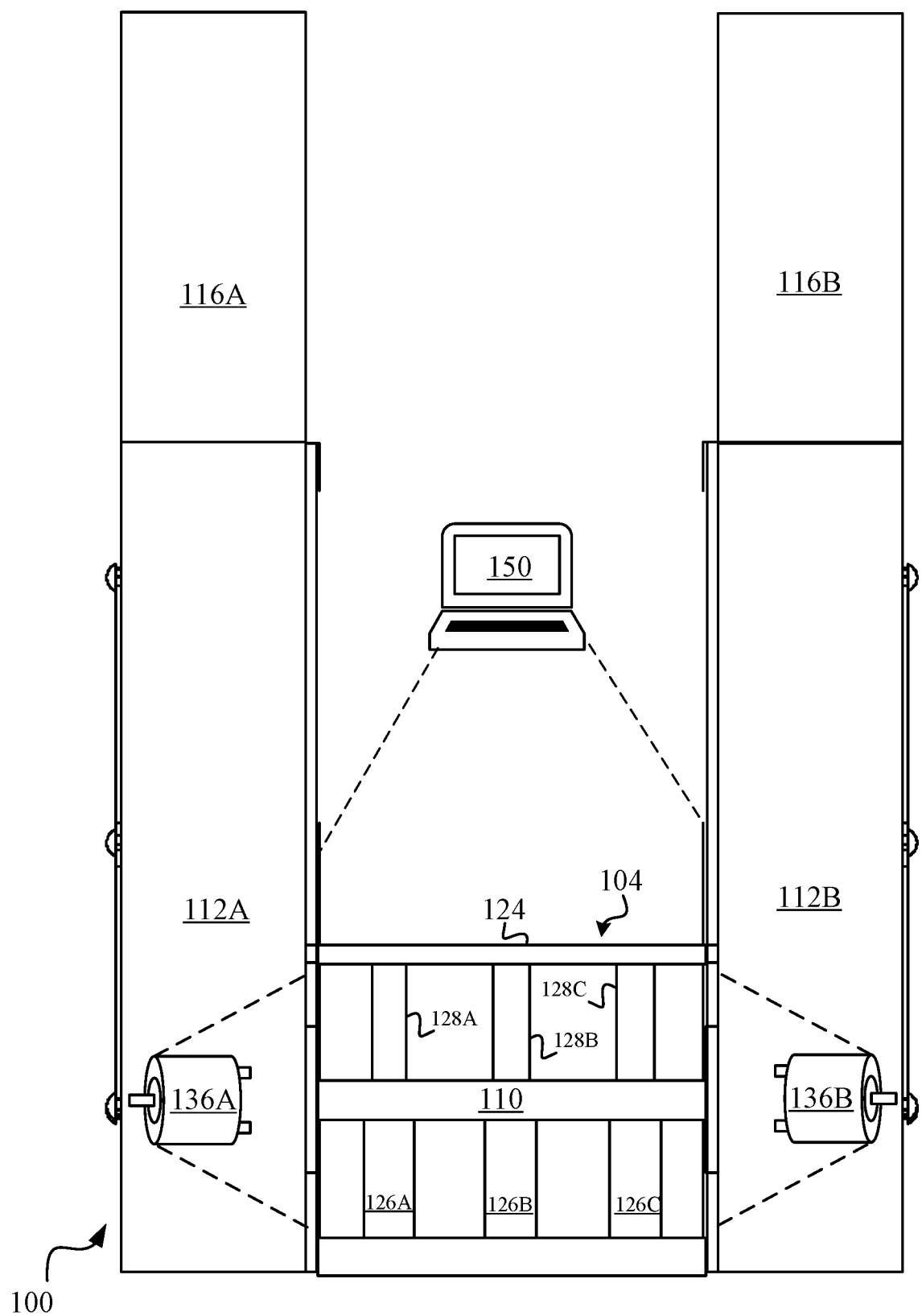
FIG. 3 shows a top/plan view of the system of FIG. 1, with the rolling-jack in its stored or folded or horizontal position.

The stored, folded or horizontal position of instant rolling-jack 104 with a swing or flip capability is shown in FIG. 3. FIG. 3 shows the top/plan view of our rolling-jack 104 of FIG. 1-2 flipped to a horizontal position. Also labelled in FIG. 3 are other components of rolling-jack 104 explained above, while the rest of the reference numerals from FIG. 1-2 have been left out to avoid detraction.

According to the instant teachings, engagement mechanism generally shown by reference numeral 108 in FIG. 1 is also responsible for flipping jack 104 open or vertical before engagement in the preferred embodiment. For this purpose, appropriate electrical or electromechanical or hydraulic drives may be employed to open/flip rolling-jack 104 to a vertical/operative position or to fold it to a horizontal/stored position as and when needed. FIG. 3 shows motors/drives 136A and 136B in exploded views that under the direction of guidance system 150, to be discussed further below, flip rolling-jack between horizontal and vertical positions as desired.

Once in its vertical or operative position as shown in FIG. 1-2, rolling-jack 104 is automatically locked in this vertical position by an appropriate electrical, mechanical or electromechanical mechanism to ensure secure lifting of the vehicle. Such locking mechanisms can come in a variety of forms using designs available in the art and are not explicitly delved into detail in this specification. In other variations, the rolling-jack is always in its vertical position without a swing/flip capability for folding or horizontal storage. Further, multiple rolling-jacks may also be employed besides just one rolling-jack 104 shown in the embodiments of FIG. 1-3. Such a multi-jack configuration will be discussed further below in this disclosure.

Regardless of whether rolling-jack 104 has a flip/swing capability, for the engagement of rolling-jack 104 to occur with vehicle 140, engagement mechanism 108 (see FIG. 1-2) first preferably performs any necessary lateral adjustment of the reach of its lift pads 122A-B. In such an embodiment, the engagement mechanism is said to be adjustable such that the lateral reach or distance between the lift pads can be adjusted. Many ways of such an adjustable engagement mechanism are possible.

Techniques for such an adjustable engagement mechanism include having two laterally opposite telescopic or robotic ends. Details of such an embodiment are best shown in FIG. 1. Referring back to FIG. 1, lift pads 122A and 122B are attached to two respective telescopic ends 120A and 120B. Telescopic/robotic ends 122A-B are endowed with a motorized mechanism for adjustment. Such a motorized mechanism can use a single motorized drive for each end 120A, 120B or a single motorized drive for both ends 120A-B.

A number of techniques of such motorized telescopic/robotic ends can be deployed. The embodiment of FIG. 1 shows a linear motor/drive 134A in an exploded view to drive telescopic end 120A. A corresponding linear motor/drive 134B to drive telescopic end 120B is presumed to exist but not explicitly shown in FIG. 1 to avoid clutter. To adjust the reach, linear drives 134A-B elongate or retract their linear ends which are in turn connected to telescopic ends 120A-B respectively of rolling-jack 104. Jacking power mechanism 110 jacks up and down connecting arm 124 along with its telescopic ends 120A-B and lift pads 122A-B.

In a related embodiment, the reach of the lift pads is fixed, and the above step of reach adjustment is skipped. In such variations, the rolling-jack has lift pads that are fixed to a given location on the rolling-jack. In one exemplary embodiment, such a location may be directly above a sub-system of a hydraulic jacking power mechanism.

An automated rolling-jack system of the present teachings also has a guidance system. FIG. 1-3 show such a guidance system 150. Guidance system 150 is the "brains" behind the automation of the system. Guidance system 150 guides or controls transportation mechanism 106, engagement mechanism 108 and jacking power mechanism 110 for automating the operation of system 100. Guidance system 150 runs a computer program and has associated interfaces to the physical controls of mechanisms 106, 108 and 110 of rolling-jack 104.

Such physical controls may employ microcontroller devices that interface with and power the drives/motors 132A-B of transportation mechanism 106, drives/motors 136A-B of a flipping mechanism (if present) and reach adjustment or linear drives 134A-B of telescopic ends 120A-B of an adjustable engagement mechanism 108 (if present) as well as the hydraulic or other powering mechanisms of jacking power mechanism 110. As already noted, that flipping mechanism 108 and an adjustable engagement mechanism with telescopic ends 120A-B are optional features that may not be present in all embodiments.

Now, let us understand the functionality of guidance system 150 of FIG. 1-3 further. To achieve its objectives, guidance system 150 employs any combination of sensors/cameras, computer vision and machine learning. For this purpose, let us first understand the sensor based guidance employed by the present design in detail.

Sensor Based Guidance

Guidance system 150 employs sensors on the rolling-jacks and/or the drive-on lifts and/or in the environment of the service center to guide/direct/control transport, engagement and jacking power mechanisms 106, 108 and 110 of rolling-jack 104 taught above. These sensors include one or more from a variety of sensors, including but not limited to the following:

a. Global Positioning System (GPS) sensors: A widely used technology typically for determining absolute position with respect to the earth. Since it uses satellites, outdoor use is preferred. If the indoor area is big and does not have multilayered walls and is not underground then it can work with reduced accuracy even indoors. Routine GPS have a precision of 2.5 meters or more. However, by using various techniques known in the art, the accuracy can be improved all the way up to 4 inches.

b. Magnetometer: These are used to determine the orientation of the device with respect to the earth's magnetic axis.

c. Angle sensors: They are used to determine the angle between two objects. They can be contact type sensors or non-contact type sensors such as optical or magnetic encoders. In the industry, non-contact type magnetic angle sensors are preferred for very long life. They typically have 0.1° accuracy.

d. Proximity sensors: There are two main types of proximity sensors for present consideration. One is based on ultrasonic wave reflection and other is based on infrared ray reflection. Ultrasonic sensors have greater range and can work up to 4 meters whereas infrared sensors work up to 0.8 meters. They typically have around 2 milli-meter accuracy. Ultrasonic sensors are preferred due to their robustness against the surface properties as color and temperature of surface does not impact their performance.

e. Laser obstruction sensors: These are simple sensors where a focused beam of light is projected on a photo-receiver on the other end. During such time when there is no obstruction, the circuit is closed. But as soon as some object enters in the path between the source and the receiver, the circuit becomes open.

f. Lidar (Light Detection And Ranging): A Lidar sensor/instrument measures the distance to a target by sending a pulsed laser light to the target, and then measuring the reflected pulses with a sensor. Differences in the return times and wavelengths of the laser are then used to make digital representations of the target. This technology is popularly used to make high-resolution maps as well as for control and navigation of some autonomous cars.

g. Image sensors: These are matrices of photodiodes of various sizes such as 16×16 or 32×32. Each diode senses the light coming to it and gives a voltage proportional to the intensity of the light. They can be used to detect a light source. With appropriate lensing, they are configured to create an imager or a camera.

h. Linear encoders: They are used to measure the linear distance travelled by one object/part with respect to another object/part. They come in various shapes and sizes and can have accuracy less than 0.1 milli-meter.

i. Indoor Positioning/Position Systems (IPS): Sometimes also referred to as indoor location sensing/positioning systems, IPS systems can employ a variety of sensors technologies. These include Global Positioning System (GPS) sensors introduced above in situations where the signal indoors is strong enough to be able to have a high degree of location accuracy, ideally a few centimeters. Additional possibilities include but are not limited to any combination of technologies including GPS, Wi-Fi, WiMax, Ultra-wideband (UWB), Bluetooth, cellular, Lidar, radar, as well as locally placed/installed beacons, and other like or otherwise solutions or sensors suitable for getting a fix on the current location of an object.

Still additionally, any combination of the above described sensors, including those in sub-sections (a) though (i) of this section, may also be used to implement an IPS solution. Exemplary industry solutions that may be considered IPS or IPS-like include those from Navizon Technology, Skyhook Wireless, Acuity Brands, Locata (LocataTech—sometimes referred to as "Your own GPS"), etc.

IPS or IPS-like solutions may use any combination of techniques known in the art, such as triangulation, trilateration, dead-reckoning, geo-location, geo-fencing, etc. to obtain a fix on the present location of the sensor(s) in question. For this purpose, gyroscopic sensors and accelerometers may also be employed. The solutions may also combine these technologies and approaches with statistical techniques such as Bayesian statistical analysis and Kalman filtering and the like. For a thorough treatment of these and related subjects, the reader is directed to the books "Indoor Wayfinding and Navigation" dated 2015 of CRC Press, edited by Hassan A. Karimi (ISBN-13: 978-1482230840, ISBN-10: 1482230844), and "Indoor Location-Based Services: Prerequisites and Foundations" dated 2013 by Martin Werner (ISBN-13: 978-3319106984, ISBN-10: 3319106988).

In yet another variety of such IPS-like indoor location sensing/positioning systems referred to as a visual positioning service (VPS), computer vision and augmented reality (AR) are used in conjunction with a camera(s) to locate/sense the position of objects in a 3-dimensional (3D) environment. An exemplary implementation of such a system is the VPS system of Google, enabled by Google Tango.

j. In general: The present teachings and sensor based guidance are agnostic to a particular choice of sensors, technologies, techniques or approaches. As such, the teachings are easily extended to any type of sensor(s)/ camera(s) and associated hardware or software that may be used to sense its own position or the position of an object in an environment. For this purpose, the sensor(s)/camera(s) may be installed on the rolling-jacks and/or the drive-on lifts and/or the environment (such as the service bay or anywhere else in the service center) and/or the vehicles themselves. Obviously, the camera(s) may just produce still images or a continuous/video output.

The knowledge of this position, also sometimes referred to as obtaining a "fix", is then employed in automating a variety of rolling-jack operations. The details of such automation are presented throughout this disclosure in reference to the various embodiments. Specifically, it is guidance system 150 of FIG. 1-3 that sends commands to the respective drives of the various mechanisms of rolling-jack 104 for the automation of these operations. Depending on the implementation, guidance system 150 thus automates/performs one or more of the following tasks, including but not limited to:

1. Automating transportation mechanism 106 of rolling-jack 104, by specifically sending start/stop commands to drives 132A-B to move and stop rolling-jack at its engagement location.
2. Automating engagement mechanism 108 of rolling-jack 104, by specifically sending start/stop commands to drives 136A-B to flip the rolling-jack to a vertical position, if a flipping capability is present.
3. Automating engagement mechanism 108 of rolling-jack 104, by specifically sending start/stop commands to drives 134A-B to adjust reach of lift pads 122A-B, if an adjustable engagement mechanism is present as taught above. This guidance along with (1) above is used to ensure that lift pads 122A-B are directly underneath their corresponding target lift points 142A-B of vehicle 140 (see FIG. 2).
4. Knowing the exact position of vehicle 140 in service bay 160 for proper engagement and safe hoisting.
5. Guiding the transportation of vehicles (autonomous or otherwise), such as vehicle 140 to an appropriate service bay, such as service bay 160, as will be explained further below.

Sensor based guidance of the present teachings may also employ other sensors including but not limited to inertial sensors such as accelerometers, gyroscopes, vibration sensors or optical flow sensors (for motion detection or other relevant applications), acoustic sensors, microwave sensors, ultrasonic, sonars or radio frequency identification (RFID) sensors (for position/location information and other relevant applications), compasses, Hall effect sensors or magnetometers or angle sensors (for orientation information and other related applications), etc.

Additionally, techniques known in the areas of inertial navigation systems (INS) and simultaneous localization and mapping (SLAM) may also be applied for position/location determination applications of the present design. For a given implementation, the choice and determination of the presently described techniques, technologies, approaches and sensors will be apparent to a person of average skill who will also understand their particular limitations, pros and cons and suitability for specific situations.

Thusly, the list of sensors used by the system includes but is not limited to cellular transceivers, Global Positioning System (GPS) sensors, Indoor Positioning System (IPS) sensors, Wi-Fi transceivers, WiMax transceivers, Ultra-wideband (UWB) sensors, Lidars, radars, sonars, Bluetooth transceivers, beacons, ZigBee sensors, IPv6 over Low power Wireless Personal Area Networks (6LoWPAN) sensors, accelerometers, gyroscopes, vibration sensors, optical flow sensors, compasses, magnetometers, Hall effect sensors, acoustic sensors, microwave sensors, ultrasonic sensors, infrared sensors, radio frequency identification (RFID) sensors, angle sensors, laser based obstruction sensors, image sensors, cameras, and compression sensors, among others.

The sensors may be installed in service bay 160 of FIG. 1-3, in the overall service center where service bay 160 is located, on rolling-jack 104 itself, on drive-on lift 102 as well as on vehicle 140. The sensors are preferably only installed on rolling-jack 104 and/or drive-on lift 102, so that no retrofitting of the service center is required. Note of course, that any number of rolling-jacks such as jack 104 of FIG. 1-3 and any number of service bays such as bay 160 of FIG. 1-2 may be present.

Computer Vision and Artificial Intelligence

Instead of or in addition to using sensor based guidance techniques described above, guidance system 150 may also utilize computer vision based techniques. It may also supplement computer vision with artificial intelligence techniques of machine learning. In an exemplary embodiment, a camera fitted on drive-on lift 102 captures a screen shot or continuous video of its surroundings. In combination with any other sensors present on the lifts, the images/video from the camera and inputs/readings from the sensors are then processed by an appropriate computer software based module on the lift and/or the backend facility or the cloud. In an exemplary embodiment, this task may be carried out by the guidance system 150 of FIG. 1-3 itself.

There are many computer vision techniques that can be employed for this purpose. Computer vision techniques are typically employed in sequential stages, commonly referred to as a computer vision pipeline. A vision pipeline typically employs the following broad categories of techniques:

a. Image acquisition: The first stage of the process is the acquisition of the input data or images/videos. The data may be captured/acquired using one or more cameras or image sensors. Besides light-sensitive cameras, these sensors may also include among others, range sensors, radar, ultra-sonic sensors, etc. Depending on the types of the cameras/sensors involved, the resulting data is a two-dimensional or a three-dimensional image or a sequence of images.

b. Pre-processing: Before applying specific vision based processing to the data, it is typically necessary to do some preprocessing of the data. This is to ensure that the data satisfies certain assumptions implied by the vision techniques to be applied. Exemplary preprocessing steps include, re-sampling, noise reduction, contrast and brightness enhancements, scaling, etc.

c. Feature extraction: Next, features of interest at various levels are extracted from the image data. Typical examples include edges, lines, ridges, corners, blobs/points, shapes, motion, etc. Among the many techniques available to skilled artisans in this area is the popular Canny edge detection algorithm for edge detection.

d. Segmentation: Because of the enormity of the processing required, usually a decision needs to be made about which image regions or points are of further interest. These are then passed onto the subsequent stages.

e. Processing: At this stage, the segmented/selected data is further processed to satisfy specific objectives. These include object recognition, tracking, feature matching, pose determination, registration, etc.

f. Decision making: Finally, decisions are made about the data based on the application objectives. These may involve match/no-match decisions, pass/fail decision, or decisions flagged for further human review.

Figure 4:
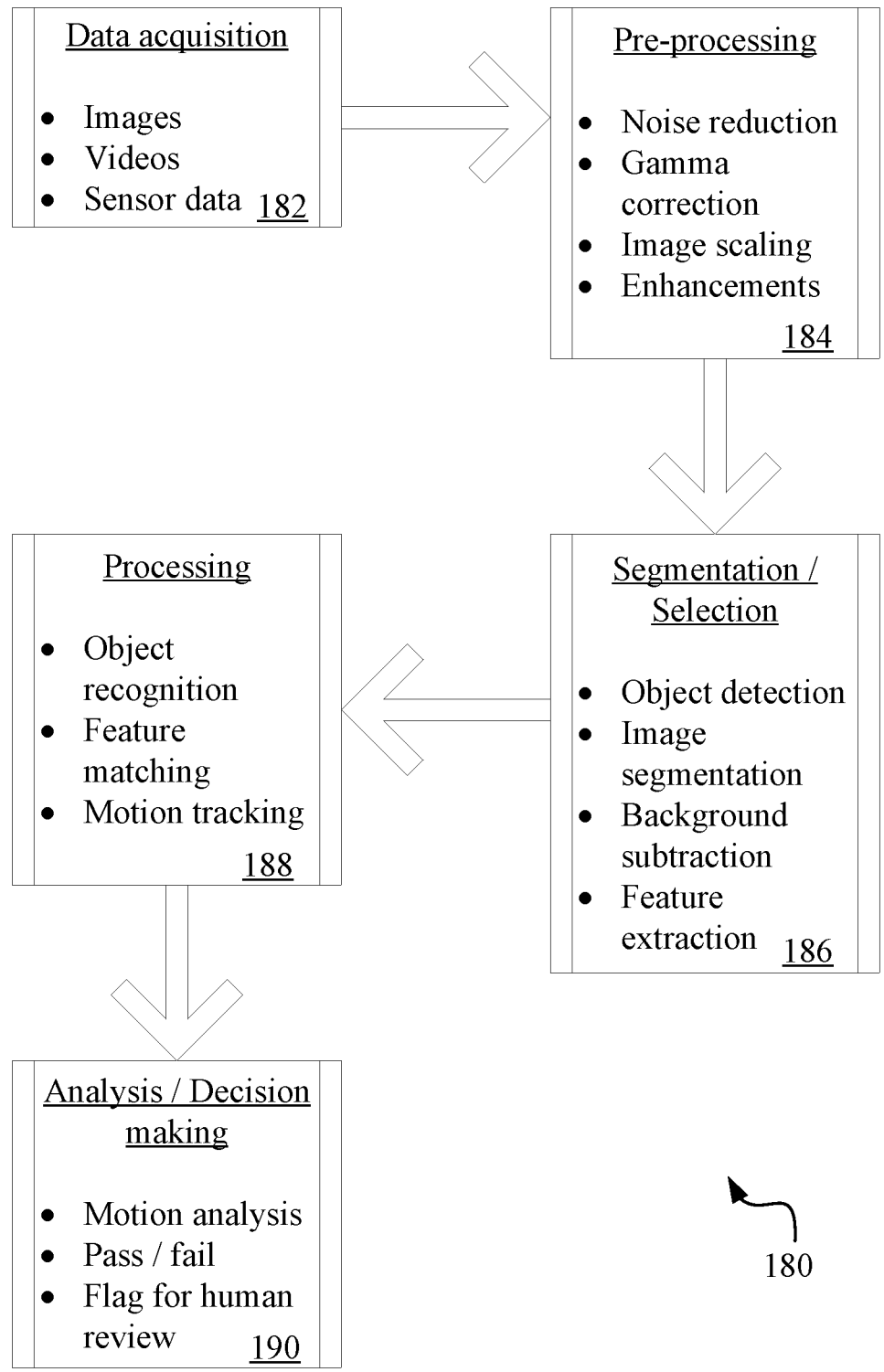
FIG. 4 shows a simplified computer vision pipeline utilized by the guidance system of the instant automated rolling-jack system design.

A simplified version of such a computer vision pipeline is illustrated in FIG. 4 with each stage of the pipeline represented by a sub-process box. Specifically, vision pipeline 180 includes sequentially fed stages of data acquisition 182, pre-processing 184, segmentation or selection of areas of interest 186, main processing 188 and analysis/decision making 190 as shown. For a more thorough treatment of the subject of computer vision pipelines, the reader is referred to Chapter 8 of the textbook "Computer Vision Metrics" by Scott Krig dated 2014.

The computer vision techniques presented above are often used in conjunction with machine learning or artificial intelligence techniques to automatically "learn" about the environment being processed. These techniques can include unsupervised learning, supervised learning or a combination of the two. In unsupervised learning, the system automatically established its knowledge about the environment whereas in supervised learning a human user imparts the right inputs and knowledge to the system for its learning and training.

For a detailed treatment of the topic of machine learning for computer vision, the reader is directed to the book "Machine Learning for Computer Vision" by Roberto Cipolla, Sebastiano Battiato and Giovanni Maria Farinella, dated 2013. Obviously, supervised and unsupervised machine learning techniques can also be used without necessarily using a computer vision pipeline in order to accrue the benefits of incrementally "learning" and improving the performance of the many embodiments described herein.

Figure 5:
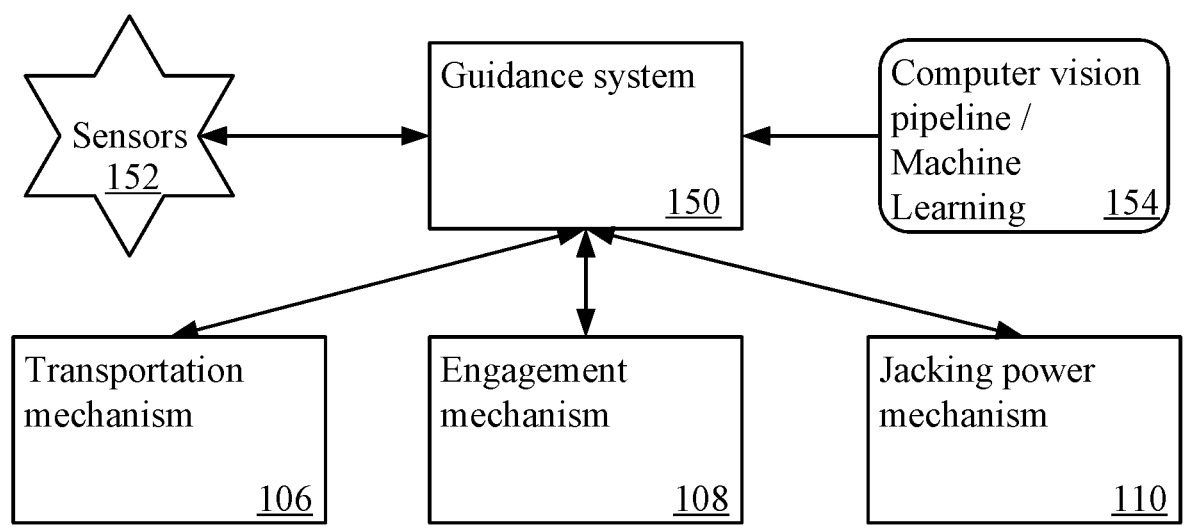
FIG. 5 shows the relationship of the guidance system with the transportation mechanism, engagement mechanism and jacking power mechanism in conjunction with use of sensors/cameras and computer vision pipeline and/or machine learning.

FIG. 5 illustrates that guidance system 150 controls/guides the various automation aspects of transportation mechanism 106, engagement mechanism 108 and jacking power mechanism 110 by utilizing sensors/cameras 152 and computer vision pipeline and/or machine learning 154. Thus, armed with the above techniques of machine learning and computer vision, guidance system 150 captures and processes input data about its environment.

As mentioned, the input data may be acquired through one or more cameras and/or additional sensors. Based on the input data at a given location of a rolling-jack, guidance system 150 will first determine the present location of the jack connected to the runways of the drive-on lift. It does so based on a combination of computer vision techniques and any sensor data available. It may also apply supervised and unsupervised machine learning for this purpose. It then directs the transportation mechanism of the rolling-jack to move/transport itself to its eventual engagement location along the runways of the drive-on lift where engagement can occur.

Alternatively, there may be a "home" location where the rolling-jack is sent to after each servicing operation. That way, guidance system 150 always has to direct the transportation mechanism of the rolling-jack from a known location along the runways to its final engagement location. Of course, multiple rolling-jacks may be operated in this manner, with each one of them being sent to the home location after servicing. Obviously, the home locations of the rolling-jacks will be different based on their relative order along the runways of the drive-on lift. However, the home location for each jack will be known by the guidance system prior to commencing transportation.

In the preferred embodiment, guidance system 150 of the above embodiments utilizes proximity sensors at lifting points or lift regions 142A-B of car 140 (see FIG. 2) to guide/home rolling-jack 104 to its eventual engagement location. It does this by activating drives/motors 132A-B (see FIG. 1) of transportation mechanism 106 to move rolling-jack 104 and "home in" or "seek" a position precisely underneath lift points 142A-B (see FIG. 2). Guidance system 150 further uses these sensors to guide/home engagement mechanism 108 with lift pads 122A-B so they securely make contact with lift points/regions 142A-B for engagement.

This way, the reach of lift pads 122A-B at telescopic ends 120A-B is adjusted as they are brought directly underneath lifting points/regions 142A-D respectively. Accordingly, sensor data is communicated by the proximity sensors to guidance system 150. Such sensor data may include the precise coordinate or locations of the lift points or of lift regions 142A-B underneath vehicle 150. Recall that there is an acceptable tolerance or regions 142A-B as shown by dotted ovals in FIG. 2 where pads 122A-B may engage. Using these coordinates, guidance system 150 then guides/directs drives/motors 134A-B to home in or seek a position directly underneath lift points/regions 142A-B.

Figure 6:
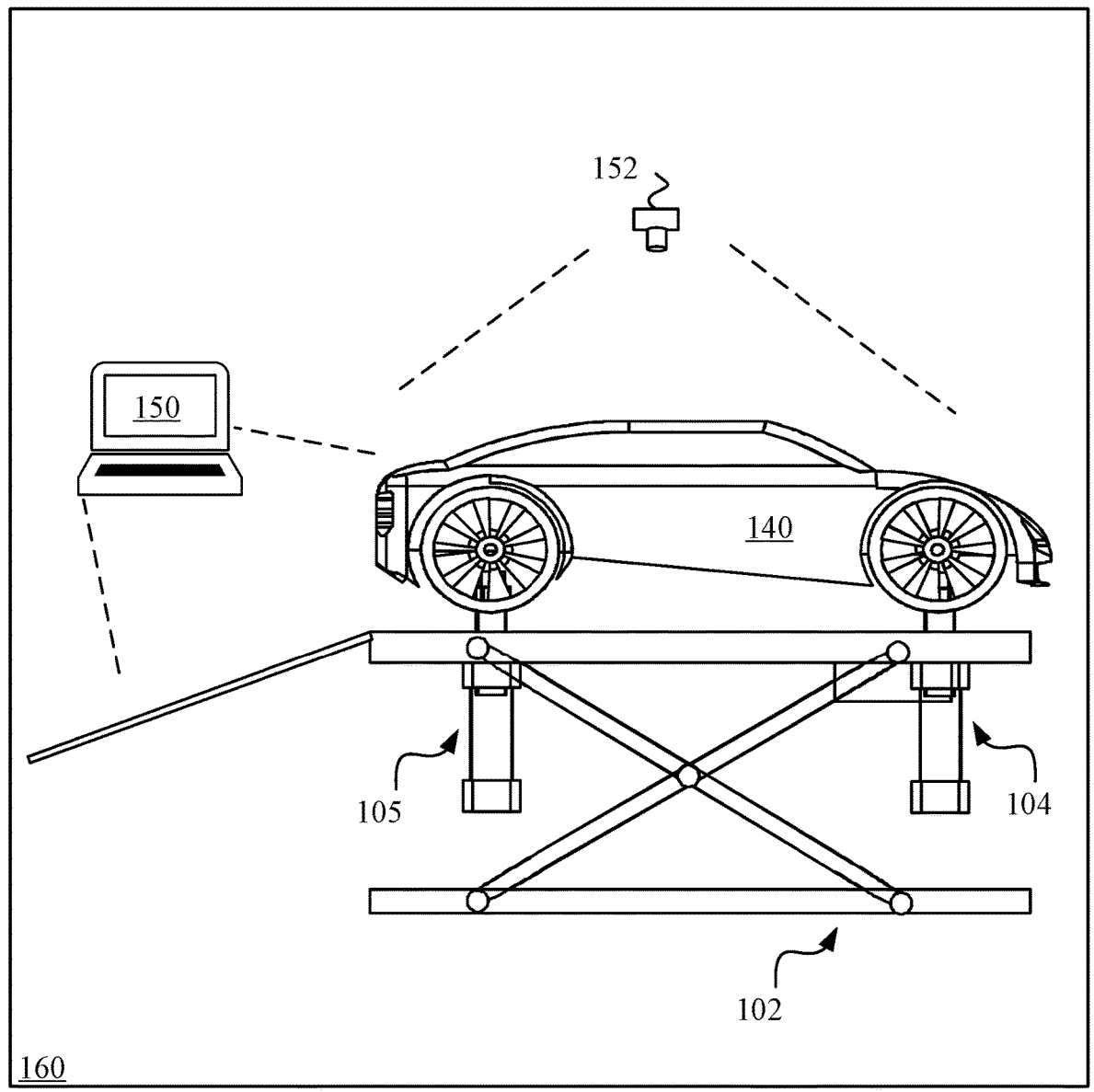
FIG. 6 shows a left view of a multi-jack system based on the instant design. Two rolling-jacks, one in the front, and one in the back, are being used to lift a car for servicing as shown.

In another preferred embodiment, guidance system 150 utilizes cameras and a computer vision pipeline for proper engagement with vehicle 140. In such an embodiment using computer vision, one or more camera(s) may be mounted on service bay 160. These camera(s) are directed at vehicle 140 from the top or the sides, or alternatively from the bottom. FIG. 6 shows the left view of a rolling-jack system 150 with two rolling-jacks 104 and 105 of the instant teachings. Also shown is drive-on lift 102 as well as guidance system 150 of the earlier embodiments, while rest of the reference numerals from earlier drawings have been omitted to avoid detraction from the principles being taught. There is also a camera 152 directed at vehicle 140 from above, while in practice there may also be multiple such cameras.

Based on image processing of the contours of vehicle 140 and the prescribed/designated lift points (not shown) underneath vehicle 140, guidance system 150 directs transportation mechanism 106 and engagement mechanism 108 of jacks 104-5, their respective telescopic ends 120A-B (if present), and lift pads 122A-B. Guidance system 150 does so by comparing the images of vehicle 140 from camera 152 with the actual dimensions of vehicle 140 as determined by its precise make and model number. It knows the make and model number by interfacing with an appropriate backend system or a vehicle-onboard diagnostics system and based on this information it knows the precise coordinates of its lift points/regions in the front underneath and the back underneath of vehicle 140. Guidance system 150 also determines the present location of rolling-jacks 104-5 based on sensor data or other image data, such as from cameras on the sides or below vehicle 140.

Alternatively, it knows the home location of jacks 104-5 per prior explanation. It then accounts for any required displacement or offset based on the present location of vehicle 140 including its lift points/regions as taught above. Then based on analytic/coordinate computations known to artisans, it directs the transportation mechanism 106 and engagement mechanism 108 (if adjustable) of rolling-jacks 104 and 105 of FIG. 6 to position them directly underneath the designated lift points in the front underneath and back underneath of vehicle 140. For this purpose, it sends start/stop commands to respective drives 132A-B, 134A-B and 136A-B as already taught above (also see FIG. 1-3 and associated explanation).

In still other embodiments, cameras may be deployed on arm 124, telescopic/robotic ends 120A-B, and/or lift pads 122A-B of rolling-jacks 104 and 105 in conjunction with a computer vision pipeline, image processing and machine learning. The end result is again the positioning of rolling-jacks 104, 105 of FIG. 6 by guidance system 150 directly underneath the designated lift points (not shown in FIG. 6) of vehicle 140 so that engagement can occur.

In still other embodiments, any other suitable choice or combinations of sensors available in the art may be deployed. For example, an indoor positioning system (IPS) may be employed by guidance system 150 with any combination of sensors installed on vehicle 140 and/or rolling-jacks 104-105 and/or drive-on lift 102 and/or the service bay 160 and/or service center where bay 160 is located. Additionally, wireless infrastructure outside of the service center, such as GPS satellites and cellular towers, may also be employed.

Figure 7:
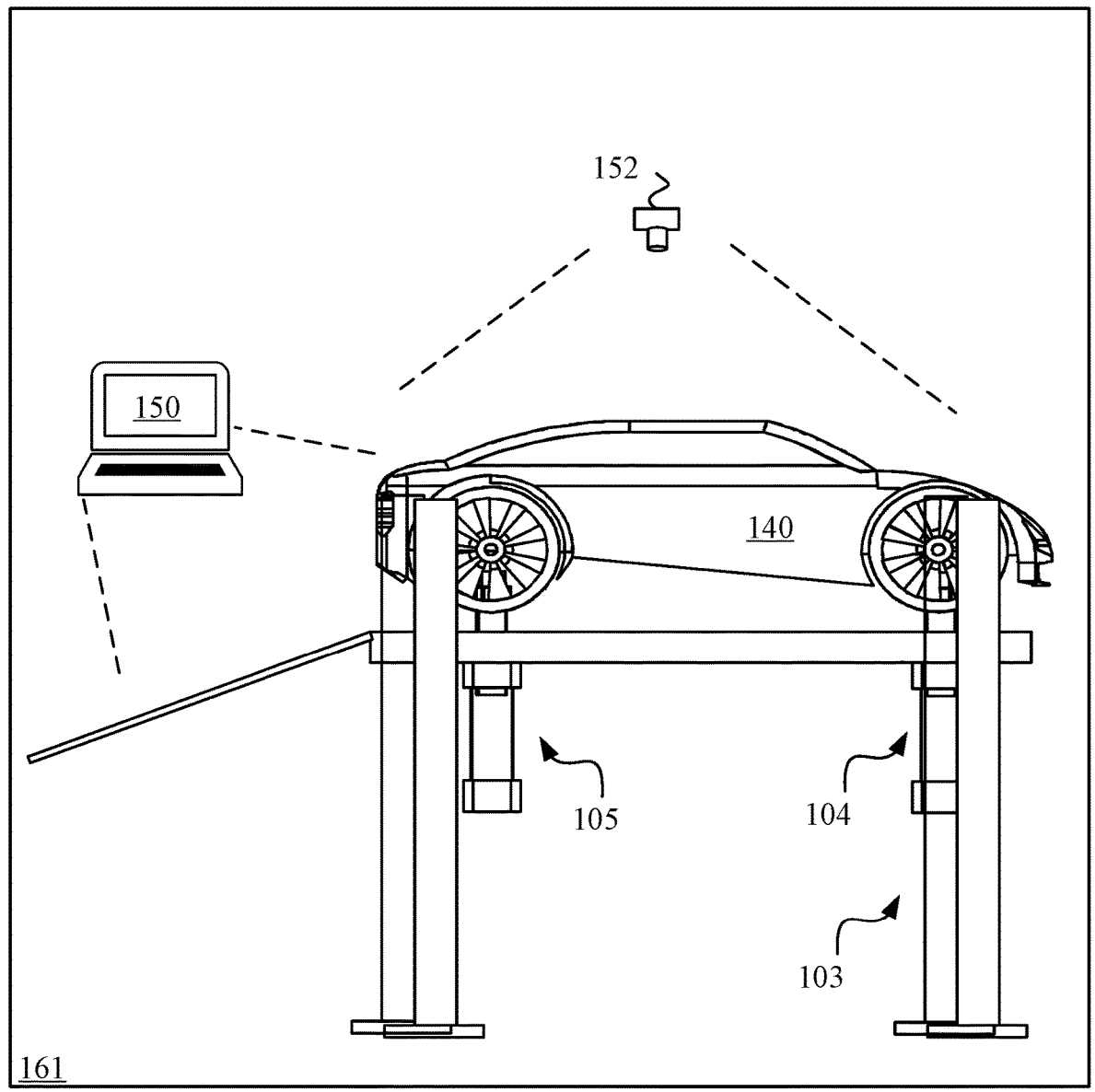
FIG. 7 shows a left view of a multi-jack system based on the instant design employing a four-post lift. Two rolling-jacks, one in the front, and one in the back, are being used to lift a car for servicing as shown.

Then based on the above sensor infrastructure, vehicle 140 which may be an autonomous vehicle, is guided to a suitable service bay 160 with sufficient lift capacity. Also, based on sensor data obtained from the above infrastructure, instant guidance system 150 then activates/guides/controls/directs the transportation and engagement mechanisms of rolling jacks 104 and 105 for a secure engagement and lifting of vehicle 140 to occur per above teachings. FIG. 6 shows both the front and the back of vehicle 140 lifted by rolling-jacks 104 and 105 respectively of the instant teachings. For completeness, FIG. 7 shows a variation of the embodiment of FIG. 6 having a rolling-jack system 151 employing a commonly used four-post lift 103 installed in service bay 161. The rest of the functionality of system 151 with rolling-jacks 104-5 is as per prior explanation in reference to FIG. 6.

Figure 8:
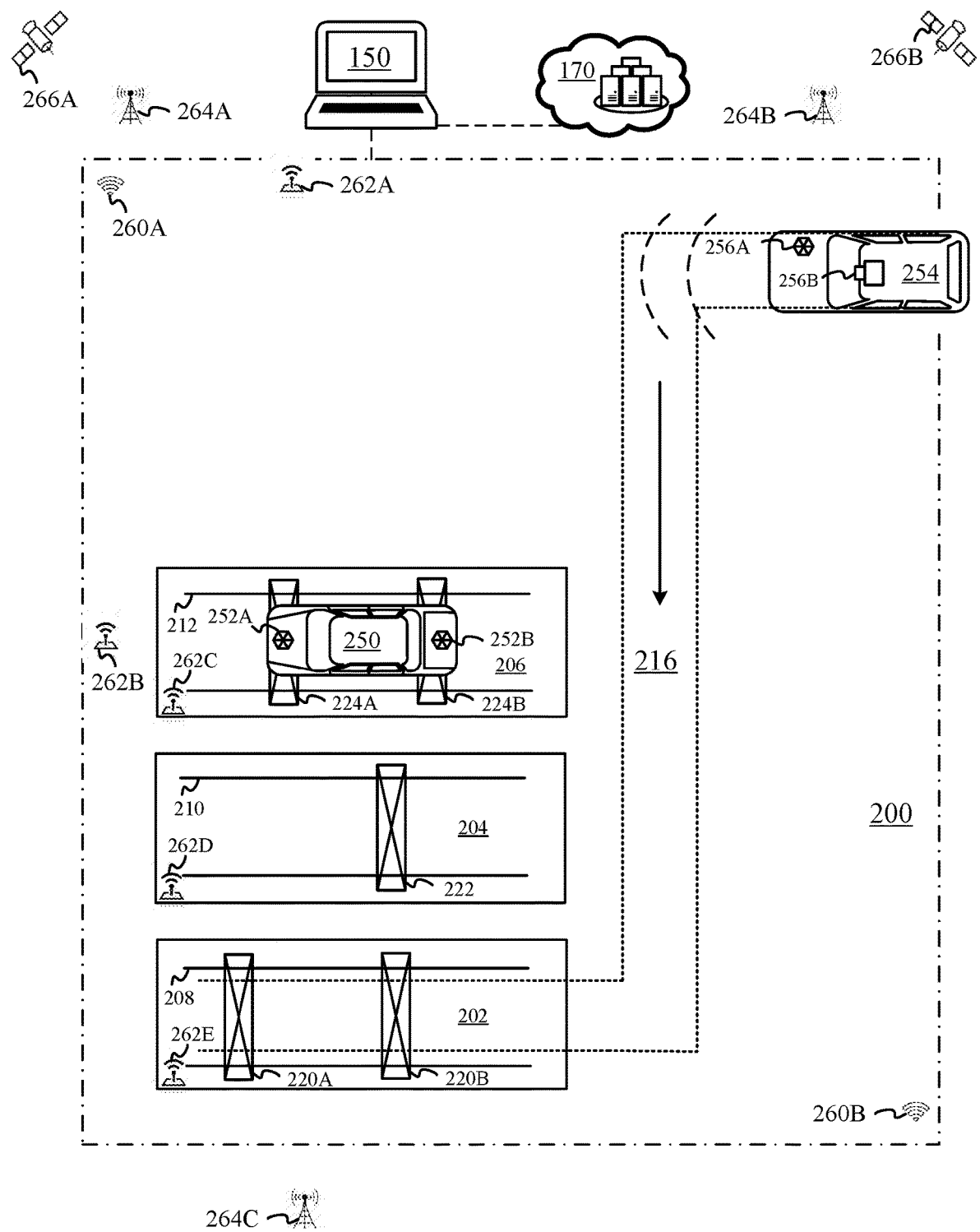
FIG. 8 shows the employment of sensors/cameras in the infrastructure surrounding the instant design. Also shown are vehicles with sensors being serviced that may be autonomous or semi-autonomous or non-autonomous.

FIG. 8 shows an embodiment with service center/facility 200 indicated by the dotted and dashed rectangle. Service center or facility 200 has rolling-jacks 220A, 220B on drive-on lift 208 of service bay 202, rolling-jack 204 on drive-on lift 210 of service bay 204 and rolling-jacks 224A, 224B on drive-on lift 212 of service bay 206.

FIG. 8 also shows various types of wireless technologies, any combination of which may be utilized to obtain a fix on the present location of a sensor in the indoor environment of service center 200. A given implementation of the present teachings may use all or some of the wireless technologies shown in the exemplary embodiment of FIG. 8 for explanatory purposes.

The wireless technologies specifically shown in the example of FIG. 8 include the infrastructure outside of facility 200, such as GPS satellites 266A and 266B and cellular towers 264A, 264B and 264C. The wireless infrastructure inside service center 200 includes Wi-Fi transceivers 260A and 260B (which may be Wi-Fi access points), and locally installed beacons 262A, 262B, 262C, 262D and 262E.

Moreover, vehicle 250 has a sensor 252A for obtaining a precise fix on its location based on some or part of the above described outside and/or inside wireless infrastructure. Sensor 252A may be a GPS receiver, a Wi-Fi transceiver, a cellular transceiver or some other appropriate electromagnetic/radio transceiver or sensor. In other variations, it is conceivable that beacons are present on the vehicles themselves to assist the guidance system or another appropriate backend system to determine the location of the vehicles within the shop/facility.

Vehicle 250 of FIG. 8 also has a sensor 252B for wirelessly communicating/broadcasting its coordinates, or the coordinates of its various lift points underneath the vehicle to guidance system 150. The communication may also involve using an appropriate API including but not limited to any appropriate methods, tools, techniques, subroutines or protocols for such communication/interfacing available in the art. For this purpose, sensor 250B may use Wi-Fi, Cellular, Bluetooth, ZigBee, 6LoWPAN, or some other suitable wireless technology available in the art. In comparison, vehicle 254 has only sensor 256A which has a composite functionality for both obtaining a fix on the location of vehicle 254 in service center 200 as well as transmitting the coordinates of its lift points to guidance system 150. In addition, vehicle 254 has a camera 256B.

Let us look at the operational working of the above embodiment in more detail. Let us assume that vehicle 250 has just arrived in facility 200 and is parked in service bay 206 as shown. Per above discussion, sensor 252A and/or sensor 252B are present on vehicle 250, either in an integrated/embedded or a retrofitted manner. First, sensor 252A will determine the precise location or fix on the location of vehicle 250. For this purpose, it will use one or more of the various wireless technologies shown. The choice of such technologies and IPS solutions will depend on a specific implementation as will be appreciated by skilled artisans.

As will also be appreciated by skilled artisans that sensors 252A-B will normally work in conjunction with a computer software or hardware module present in the car. This may be a vehicle-onboard diagnostics and/or a telematics system or another dedicated software or hardware module working with sensors 252A-B. The fix obtained by sensor 252A is communicated to sensor 252B and/or such a software/hardware module, which then computes the precise coordinates of lift points of vehicle 250. It is able to do that because it knows the specification of vehicle 250 itself, including vehicle length, vehicle width, size, number and location of axles, diameter and width of the tires, make, model, etc.

The above parameters may be configured into the telematics/diagnostics system or in the dedicated software/hardware component/module working with sensor 252A and/or 252B. Such configuration may be done for an integrated sensor at the time of manufacture. It may also be performed by a car dealer or an Original Equipment Manufacturer (OEM) or a Value-Added Reseller (VAR) for a retrofitted sensor on an after-market basis. This information may also reside in a backend system 170 as shown in FIG. 8, which may be a fleet management system and with which guidance system 150 interfaces.

In any event, the transmitting/communicating/interfacing functionality of sensor 252B is then invoked to transmit the coordinates of the lift points. This invocation may also be done by the dedicated software/hardware of sensor 252B or the telematics system. Now, guidance system 150 receives these location coordinates. In one variation, guidance system 150 may just be contained on drive-on lifts 208, 210, 212 and/or rolling-jacks 220A-B, 222, 224A-B themselves. However, in the preferred embodiment, guidance system 150 has a backend/server component running on a dedicated server or in the cloud, and has a separate client component on the jacks and/or the lifts. Guidance system 150 then uses the above transmitted coordinates to automatically transport the rolling-jacks to their engagement locations per above teachings.

Furthermore, based on the specification of vehicle 250, if the engagement mechanism of the rolling-jacks is adjustable, guidance system 150 also adjusts the motorized adjustable engagement mechanism of jacks 224A-B to adjust their reach per above teachings. As part of its communication with guidance system 150, sensor 252B may also communicate any other parameters about vehicle 250, such as its weight distribution. This information may be used by guidance system 150 to further adjust the final location of the rolling-jacks for a safe engagement and lifting.

In addition to the wireless sensors associated with the infrastructure of the present embodiments shown in FIG. 8 described above, any other sensors may also be employed. These include sensors wired and instrumented into service center 200 and specifically bays 202, 204 and 206 and/or present on lifts 208, 210, 212 and/or rolling-jacks 220A-B, 222, 224A-B. Analogously to the vehicles, sensors on the lifts and the rolling-jacks may also be integrated or retrofitted. The sensors installed in the service bays and/or the lifts may also be used for obtaining coordinates of the lift points of the vehicles.

Now, in FIG. 8, an autonomous vehicle 254 is just shown entering facility 200. As shown, vehicle 254 has a sensor 256A and a camera 256B. It is understood that any number and types of sensors including cameras may be present on autonomous vehicle 254 and their location on vehicle 254 may vary. To further stress this point, camera 256B on vehicle 254 is top mounted while sensor 254A is at the front on a side, presumably under the hood.

These sensors/cameras may be used for the autonomous navigation of the vehicle as well as for obtaining a fix on its location in service center 200 and communicating with any backend system, or guidance system 150. Guidance system 150 guides the engagement mechanism of rolling-jacks 220A-B, 222, 224A-B as well as for guiding autonomous vehicle by providing it the path to follow in service center 200. In alternate and very useful variations, the autonomous vehicle itself determines the path to available service bay 202 without necessarily any guidance provided by the guidance system. The navigation system of the autonomous vehicle is well suited for the above task.

The backend system, which may be a fleet management system preferably runs in the cloud. FIG. 8 shows such a backend system 170 running in the cloud, and to which guidance system 150 is interfaced. Of course, backend/fleet management system 170 can also be housed in a local server running inside service center 200. FIG. 8 further shows path 216 within dotted lines computed by guidance system 150 or alternately by autonomous vehicle 254 itself. More specifically, the coordinates of path 216 are computed by the guidance system and communicated to vehicle 254 or the coordinates are computed by autonomous vehicle 254 itself. Following the coordinates of path 216, vehicle 254 then autonomously arrives at service bay 202 to be lifted by drive-on lift 208 with rolling-jacks 220A-B and be serviced.

In a highly preferred set of variations, the lifts are able to communicate with the autonomous vehicle to automate the engagement process. Drive-on lifts 202, 206, 208 are fixed lifts by their very nature that cannot move, and thus it is beneficial for them to give instructions to autonomous vehicle 254 to adjust its position so that it can be safely engaged by rolling-jacks 220A-B and lifted. Otherwise, technicians must frequently readjust the position of the vehicle on a fixed lift because it is improperly positioned for safe lifting. Above functionality would eliminate the need for such manual readjustment.

Thus, fixed drive-on lift 208 in conjunction with guidance system 150, gives instructions to vehicle 254 to move as required until it is in an ideal position for engagement with rolling-jacks 220A-B. This movement may be forward/backward as needed since the correct weight distribution of the vehicle may dictate that it is more forward on the lift than backward.

The above maneuvering is done by accurately knowing the position of vehicle 254 with its lifting points/regions with respect to an imaginary grid with (X,Y) coordinates in service bay 202. Then appropriate adjustments to the X and Y locations of vehicle 254 are performed by instructing the vehicle per above. Further, the above process is ideally performed with lift 208 and vehicle 254 working in cooperation to perform a successful engagement. The cooperation is enabled by continuous communication between the two.

Vehicle 254 may continually convey its position on the grid to lift 208, that may instruct it accordingly. Alternatively, sensors/cameras on lift 208 and/or bay 202 may be used to determine the accurate location of the vehicle on the grid. In particular, weight sensors on the lifts may be used in conjunction. Thus, the drive-on lift of the present design is able to guide/instruct an autonomous vehicle to drive, position and stop itself precisely at an appropriate location on the runways of the lift where rolling-jacks may be transported for engagement per above teachings. The same capability extends to semi or non-autonomous vehicle by providing the appropriate instructions to the vehicle driver on a console.

Fleets of automotive vehicles, whether autonomous or otherwise, provide interesting applications for the present technology. Examples of such fleets include but are not limited to the fleets of car rental companies such as Hertz, Avis, etc. as well as other fleets which are or may become privately owned such as Uber, Lyft, Tesla and other vehicles of the like. Telematics based fleet management software and solutions such as Fleetmatics, Telogis, etc. ensure proper and timely maintenance of the vehicles and higher availability and longevity of such fleets. Telematic and onboard sensors on the vehicles automatically and/or predictively determine when service should be scheduled within a range of time or when a part on the vehicle needs to be replaced. In addition, they can determine the schedule for routine maintenance of the vehicles, as well as any other preemptive repairs.

In an interesting application of the present technology, the present guidance system is interfaced with or directly integrated with such a fleet management solution via an application programming interface (API). Such an API is typically provided by the manufacturer of the fleet management software/solution. As shown in FIG. 8, guidance system 150 is interfacing with or is integrated with fleet management or backend system 170. By interfacing with the fleet management solution, guidance system 150 can proactively know if autonomous car/vehicle, such as car 254 is scheduled to arrive at facility 200. The design can also help facilitate such scheduling based on factors including the proximity of the vehicle to facility 200, as well as its availability for the service.

Guidance system 150 can then ensure that appropriate lifts at a suitable service bay are available as quickly as possible after the arrival of vehicle 254 for its quick servicing. Similarly, it can compute path 216 for vehicle 254 inside service center 200 in advance and communicate it to autonomous vehicle 254, so the vehicle can travel to its intended service bay 202 without delay. As already noted, in a useful variation, vehicle 254 itself locates an available service bay, such as bay 202 in service center 200 and drives to it.

Furthermore, vehicle maintenance can be directly linked to lift availability. For example, an autonomous vehicle of a fleet such as Lyft or Uber may not have a scheduled job/ride for some time. Now, if the vehicle is scheduled for maintenance based on diagnostic factors or based on timing/mileage of last maintenance, and if there is an available lift matching the vehicle in a service center within a configurable distance then the autonomous vehicle automatically travels to that lift in the corresponding service bay and is serviced. It does so by coordinating with its fleet management system working in conjunction with the present guidance system, with the former communicating with the later to schedule and notify about the arrival of the vehicle in advance. The configurable distance, for example, can be three miles. The above scenario further improves the automation of the fleet maintenance process and reduces vehicle and lift downtime.

Note that in the above embodiments employing autonomous vehicles, the degree of autonomy of the vehicles can be varied. The autonomy/automation is typically classified in levels from level 0 to level 5, as will be appreciated by skilled artisans. As such, the present variations interfacing with a fleet management solution, also work with manual or non-autonomous or level 0 vehicles. As such, the driver of the vehicle drives the vehicle to the service center and to the service bay.

In such a scenario also, the guidance system will know the arrival of the vehicle in the service center in advance. It can then ensure the availability of appropriate lifts. Depending on a specific implementation, it may also compute the path to the service bay and communicate it to the vehicle, specifically to its driver, so he/she can safely bring and park the car in service the bay. By extension, above teachings are also easily conceivable for semi-autonomous vehicles at any of the intermediate levels between level 0 and level 5.

Engagement and Lifting

Continuing first with FIG. 8, note that transport, engagement and jacking power mechanisms 106, 108 and 110 from FIG. 1-3 along with the respective components are not visible in FIG. 8 but are presumed to exist. Before engagement can commence, a vehicle such as vehicle 250 is first parked at service bay 206 utilizing above techniques. Then, guidance system 150 directs the desired number of rolling-jacks, in this case two rolling jacks 224A-B to their engagement locations alongside the runways of drive-on lift 212 for eventual engagement.

Again for this purpose, guidance system 150 utilizes any desired combination of above techniques, including sensors, cameras, computer vision and/or machine learning. At this juncture, guidance system 150 is ready to power the jacking power mechanism 110 of jacks 224A-B to lift vehicle 250 (also see FIG. 1-3 and associated explanation). Note, that in many practical situations, there may be only one rolling-jack as in the embodiments of FIG. 1-3 where the front or the back (but not both) of the vehicle is required to be lifted for the desired service.

In any event, guidance system 150 first preferably performs any needed fine-tune adjustments of the positioning of rolling-jacks 224A-B as well their lift-pads (not visible in FIG. 8) just prior to engagement to ensure a safe and secure lift. It performs this fine-tuning by appropriate activation of their transport mechanisms and/or the drive(s) of their adjustable engagement mechanisms if present. Each of transportation, engagement and jacking power mechanisms allow for respective manual override modes, in which they can be operated completely manually by overriding the guidance system.

Now let us refer back to the embodiments of FIG. 1-3 to fully appreciate the engagement and lifting processes. Recall that FIG. 1-3 employ only one rolling-jack 104 with lift points/regions 142A-B of vehicle 140 shown in FIG. 2. Lift points/regions 142A-B are preferably the prescribed lift or hoist points provided by an appropriate entity related to the vehicle, such as its manufacturer, dealer, service provider, Original Equipment Manufacturer (OEM) or a Value-Added Reseller (VAR), etc.

Alternatively, they may be computed/calculated by the guidance system for a given vehicle. This computation is preferably based on vehicle parameters such as vehicle make, model, length, width, diameter of the tires/wheels, locations and sizes of the axles, etc. It may further depend on the weight of the vehicle, whether it is loaded or not, and load related and stability factors/parameters. Additionally, the acceptable tolerance for engagement as indicated by dotted ovals in FIG. 2 are also either prescribed or calculated per above.

Just before activating jacking power mechanism 110, brakes are preferably applied to transport mechanism 106, specifically to drives 132A-B to prevent accidental movement of rolling-jack 104 during lifting. Many ways to provide such brakes to the rollers/wheels or other drive mechanism of rolling-jack 104 are conceivable by skilled artisans.

Now guidance system 150 activates jacking power mechanism 110 to lift or raise its two lift pads 122A-B to just make contact or engage with the lift points 142A-B respectively within the prescribed tolerance shown in FIG. 2. At this juncture, in one embodiment, any further operation of automated rolling-jack system 100 is paused by guidance system 150. The reason is that now a technician can arrive to visually inspect just engaged rolling-jack 104 and determine if any manual fine-tune adjustments need to be further made. This is the semi-automatic mode of operation of the system.

After human inspection and any manually over-ridden adjustments, guidance system 150 resumes the activation of jacking power mechanism 110 and continues lifting vehicle 140 to the desired height required to perform the needed service. In a highly useful alternate embodiment, the operation of the system is fully automatic and is not paused for a human inspection before engagement. In this case, guidance system 150 continues activation of jacking power mechanism 110 without interruption to lift vehicle 140 to the desired height. The desired height for service can be obtained by guidance system 150 via its interfacing with an appropriate backend system, such as a service order (SO) management system, per above teachings.

The above-described automation of transport mechanism 106, engagement mechanism 108 and jacking power mechanism 110 under the control/guidance of guidance system 150 are some of the key distinguishing aspects of the invention. The types of services performed on the vehicle once the vehicle is raised include inspection, maintenance, repair/replacement, wheel alignment, tire rotation or any other services.

In the preferred embodiment, rolling-jack 104 and/or the drive-on lift 102 can communicate with each other as well as any backend system and/or a vehicle-onboard diagnostics system via a wired or a wireless mode of communication. As already taught above, the backend system may be the backend/server component of guidance system 150, a fleet management system or some other backend Information Technology (IT) system.

In some implementations, more than one rolling-jacks may be employed with a single drive-on lift. Such an embodiment was first shown in FIG. 6. In such a setup, one rolling-jack 104 may have its engagement location at the front of vehicle 140, another rolling-jack 105 at the back of vehicle 140, and yet another (or more if needed) in between. This way, the entirety of the vehicle can be raised by the rolling-jacks. Of course, any type of vehicle may be serviced by the automating rolling-jack systems of the instant teachings, other than car 140 depicted in the exemplary drawing figures of FIG. 1-3, and FIG. 6-7.

The principles taught above apply to the automation of a multi-jack system as well. However, in such an embodiment, rolling-jacks 104-5 of FIG. 2 are first preferably locked/synchronized by guidance system 150 or another appropriate software/hardware module or control system of the jacks, before raising and lowering of the vehicle in a safe and stable manner. Such locking/synchronization assures a balanced, stable and safe lift of vehicle 140. As already taught, such a multi-jack system may have different home locations for the various rolling-jacks.

Figure 9:
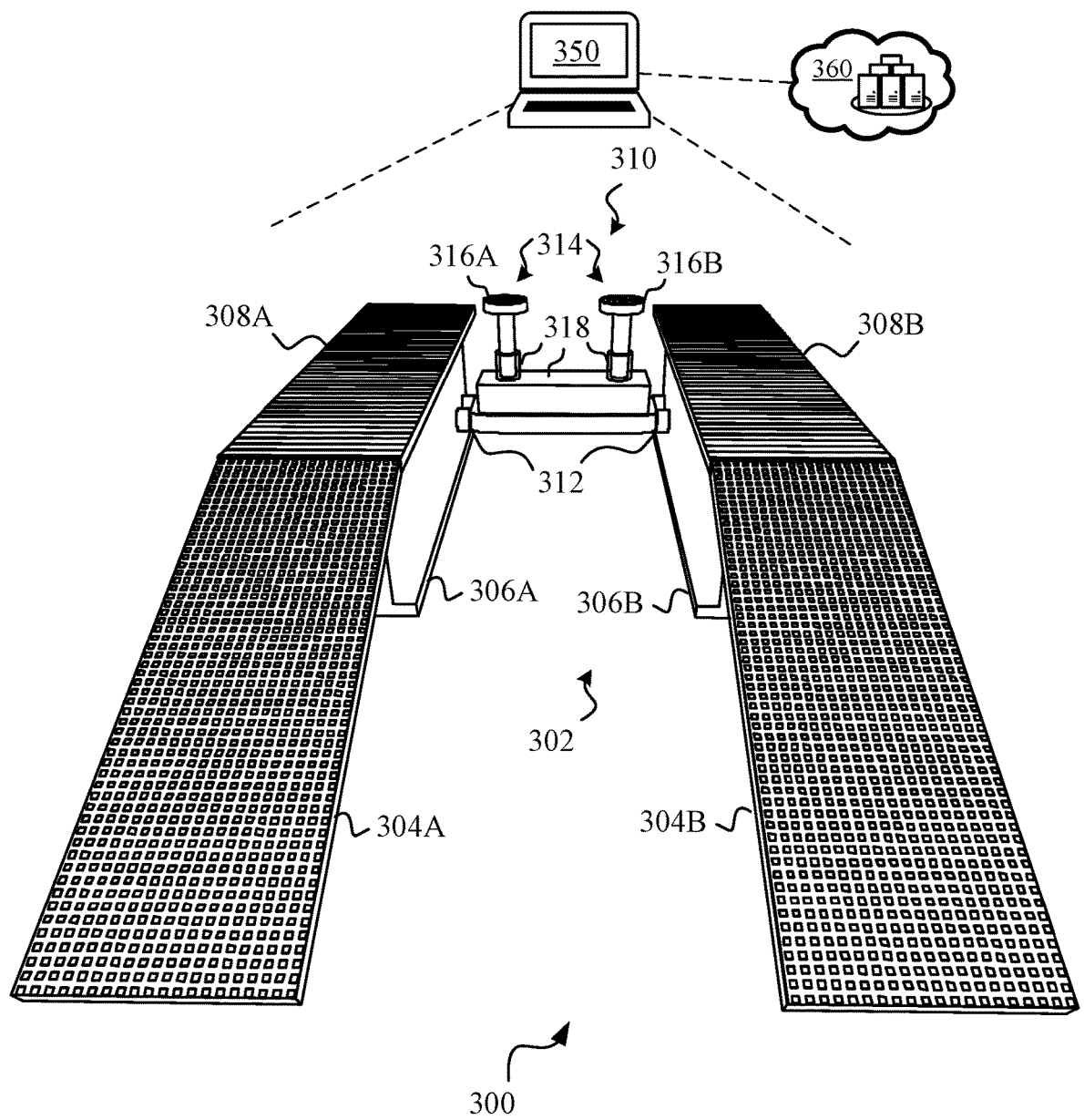
FIG. 9 shows in front perspective view, a heavy-duty automated rolling-jack system based on instant principles. The rolling-jack shown has a fixed reach.

In yet another embodiment of the instant principles, FIG. 9 shows a high lifting capacity or heavy-duty automated rolling-jack system 300. In the front perspective view shown in FIG. 9, rolling-jack system 300 has a drive-on lift 302 with ramps 304A and 304B, and runways 308A and 308B on heavy-duty bases 306A and 306B respectively. Lift 302 may be placed around a maintenance "pit" for technicians to step down into for vehicle servicing.

An instant rolling-jack 310 rolls over the lips of bases 306A-B with its transportation mechanism 312 as shown. As further shown, transportation mechanism 312 consists of 2 rollers on each side of rolling-jack 310, although any number of such rollers/wheels may be present. Automated rolling-jack 310 further has an engagement mechanism 314 which consist of two lift pads 316A and 316B. It also has a jacking power mechanism 318 with two hydraulic cylinders shown on which two lift pads 316A-B are directly affixed as shown. The reach of the embodiment of FIG. 9 can be adjusted by adjusting the distance between the two hydraulic cylinders on which lift pads 316A and 316B are affixed.

As with earlier embodiments, there is a guidance system 350 that controls/automates transportation mechanism 312, engagement mechanism 314 and jacking power mechanism 318 of rolling-jack 310 to achieve the benefits of the automated rolling-jack systems of the instant teachings. Guidance system 350 interfaces with a backend system 360 which may be a fleet management system and which may be in a cloud or in the service center. Teachings provided before for automating the operation of the rolling-jacks of earlier embodiments apply to the heavy-duty embodiment of FIG. 9 as well. These include, among others, the use of sensors, cameras, computer vision, machine learning and the relevant techniques discussed earlier.

In view of the above teaching, a person skilled in the art will recognize that the apparatus and methods of invention can be embodied in many different ways in addition to those described without departing from the principles of the invention. Therefore, the scope of the invention should be judged in view of the appended claims and their legal equivalents.

What is claimed is:

1. A system of automating the operation of a rolling-jack, said system comprising:
 (a) a motorized transport mechanism configured for motorized transport of said entire rolling-jack between, and parallel to, runways of a drive-on lift to an engagement location underneath a vehicle parked on said runways, said drive-on lift operable to lift said runways with said vehicle parked on said runways from a drive-on position to a first lift position, said transport mechanism including a transport mechanism drive configured to receive transport control command signals, said transport control command signals operable to control said transport mechanism drive to automatically transport said entire rolling-jack to said engagement location while said runways are in said first lift position;

(b) an engagement mechanism containing two lift pads at two lateral ends of said rolling-jack, for automatically engaging at two respective lift points underneath said vehicle, said engaging to occur within a prescribed tolerance, said engaging including said lift pads automatically contacting said lift points within said prescribed tolerance without additional lifting of said vehicle;

(c) a jacking power mechanism for automatically lifting and lowering said lift pads, said lifting including automatically lifting said vehicle to a second lift position after said engaging has occurred, wherein in said second lift position wheels of said vehicle are lifted off of said runways while said runways are in said first lift position; and (d) a guidance system utilizing one or more sensors for guiding said transport mechanism, said engagement mechanism and said jacking power mechanism, said guidance system operable to generate said transport control command signals;

wherein said guidance system comprises a microprocessor executing program instructions stored in a non-transitory storage medium.

2. The system of claim 1 wherein said one or more sensors are present in at least one of said drive-on lift, said rolling jack and said vehicle in one or both of an integrated and a retrofitted manner.

3. The system of claim 2 wherein said one or more sensors comprise at least one of a cellular transceiver, a Global Positioning System (GPS) sensor, an Indoor Positioning System (IPS) sensor, a Wi-Fi transceiver, a WiMax transceiver, an Ultra-wideband (UWB) sensor, a Lidar, a radar, a sonar, a Bluetooth transceiver, a beacon, a ZigBee sensor, an IPv6 over Low power Wireless Personal Area Networks (6LoWPAN) sensor, an accelerometers, a gyroscope, a vibration sensor, an optical flow sensor, a compass, a magnetometer, a Hall effect sensor, an acoustic sensor, a microwave sensor, an ultrasonic sensor, an infrared sensor, a radio frequency identification (RFID) sensor, an angle sensor, a laser based obstruction sensor, an image sensors and a camera.

4. The system of claim 1 wherein said one or more sensors are present on said vehicle and said one or more sensors communicate coordinates of said lift points to said guidance system for assisting in said guiding.

5. The system of claim 1 comprising:
said entire rolling-jack operable to be stored in a horizontal position, and operable to be rotated to a vertical position for said engaging; and
said engagement mechanism configured to receive engagement control command signals generated from said guidance system, said engagement control command signals operable to control said engagement mechanism to automatically rotate said entire rolling-jack from said horizontal position to said vertical position and to automatically lock said rolling-jack in said vertical position.

6. The system of claim 1 wherein said engagement mechanism is adjustable allowing a reach of said lift pads to be adjusted.

7. The system of claim 1 further comprising an interface to one or both of a backend system and a vehicle-onboard diagnostics system.

8. The system of claim 1 wherein a service is performed on said vehicle after said lifting, said service comprising at least one of an inspection service, a maintenance service and a repair service.

9. The system of claim 1 wherein said guidance system utilizes at least one of a computer vision pipeline and machine learning, for said guiding.

10. The system of claim 1 wherein said vehicle is one of an autonomous vehicle and a semi-autonomous vehicle.

11. The system of claim 10 wherein said drive-on lift communicates with said vehicle to drive, position and stop itself on said runways where said engaging and said lifting can occur safely.

12. A method of automating the operation of a rolling-jack, said method comprising the steps of:

(a) providing a motorized transport mechanism configured for motorized transport of said entire rolling-jack between, and parallel to, runways of a drive-on lift to an engagement location underneath a vehicle parked on said runways, said drive-on lift operable to lift said runways with said vehicle parked on said runways from a drive-on position to a first lift position, said transport mechanism including a transport mechanism drive configured to receive transport control command signals, said transport control command signals operable to control said transport mechanism drive to automatically transport said entire rolling-jack to said engagement location while said runways are in said first lift position;

(b) providing an engagement mechanism containing two lift pads at two lateral ends of said rolling-jack, for automatically engaging at lift points underneath said vehicle, said engaging to occur within a prescribed tolerance, said engaging including said lift pads automatically contacting said lift points within said prescribed tolerance without additional lifting of said vehicle;

(c) providing a jacking power mechanism for automatically lifting and lowering said lift pads, said lifting including automatically lifting said vehicle to a second lift position after said engaging has occurred, wherein in said second lift position wheels of said vehicle are lifted off of said runways while said runways are in said first lift position; and (d) providing a guidance system utilizing one or more sensors for guiding said transport mechanism, said engagement mechanism and said jacking power mechanism, said guidance system operable to generate said transport control command signals.

13. The method of claim 12, further comprising providing said one or more sensors on at least one of said drive-on lift, said rolling-jack, said vehicle, a service bay where said drive-on lift is located and a service center where said service bay is located.

14. The method of claim 13, further comprising providing said one or more sensors to comprise at least one of a cellular transceiver, a Global Positioning System (GPS) sensor, an Indoor Positioning System (IPS) sensor, a Wi-Fi transceiver, a WiMax transceiver, an Ultra-wideband (UWB) sensor, a Lidar, a radar, a sonar, a Bluetooth transceiver, a beacon, a ZigBee sensor, an IPv6 over Low power Wireless Personal Area Networks (6LoWPAN) sensor, an accelerometers, a gyroscope, a vibration sensor, an optical flow sensor, a compass, a magnetometer, a Hall effect sensor, an acoustic sensor, a microwave sensor, an ultrasonic sensor, an infrared sensor, a radio frequency identification (RFID) sensor, an angle sensor, a laser based obstruction sensor, an image sensors and a camera.

15. The method of claim 12, further comprising providing:
- said entire rolling-jack operable to be stored in a horizontal position, and operable to be rotated to a vertical position for said engaging; and
- said engagement mechanism configured to receive engagement control command signals generated from said guidance system, said engagement control command signals operable to control said engagement mechanism to automatically rotate said entire rolling-jack from said horizontal position to said vertical position and to automatically lock said rolling-jack in said vertical position.

16. The method of claim 12, further comprising providing said engagement mechanism to be adjustable allowing a reach of said lift pads to be adjusted.

17. The method of claim 12, further comprising providing said guidance system to utilize at least one of a computer vision pipeline and machine learning, for said guiding.

18. The method of claim 12, further comprising providing said vehicle to be one of an autonomous vehicle and a semi-autonomous vehicle.

19. The system of claim 1, wherein first and second transport wheels are positioned on opposing sides of said rolling-jack and are mechanically engaged with a rail on each of the runways, said first and second wheels operable to be driven by said transport mechanism drive to provide motorized transport of the entire transport mechanism along the rails of the runways while said runways are in said first lift position.

20. The method of claim 12, wherein first and second transport wheels are positioned on opposing sides of said rolling-jack and are mechanically engaged with a rail on each of the runways, said first and second wheels operable to be driven by said transport mechanism drive to provide motorized transport of the entire transport mechanism along the rails of the runways while said runways are in said first lift position.

* * * * *